(12) United States Patent
Diemer et al.

(10) Patent No.: US 7,804,044 B2
(45) Date of Patent: Sep. 28, 2010

(54) HEATING DEVICE AND METHOD FOR THE PRODUCTION THEREOF AND HEATABLE OBJECT AND METHOD FOR PRODUCING SAME

(75) Inventors: Michael Diemer, Jönköping (SE); Stephan Diemer, Alsheim (DE)

(73) Assignee: brainCOM AG, Munich (DE)

( * ) Notice: Subject to any disclaimer, the term of this patent is extended or adjusted under 35 U.S.C. 154(b) by 0 days.

(21) Appl. No.: 10/967,664

(22) Filed: Oct. 18, 2004

(65) Prior Publication Data

US 2010/0000981 A1 Jan. 7, 2010

Related U.S. Application Data

(63) Continuation-in-part of application No. 10/464,822, filed on Jun. 18, 2003, now Pat. No. 7,250,586, and a continuation of application No. PCT/DE03/01309, filed on Apr. 22, 2003, which is a continuation of application No. PCT/DE01/04879, filed on Dec. 21, 2001.

(30) Foreign Application Priority Data

Dec. 23, 2000 (DE) .............................. 200 21 949 U
Apr. 18, 2002 (DE) .............................. 202 06 191 U

(51) Int. Cl.
*H05B 1/00* (2006.01)
(52) U.S. Cl. ........................ 219/217; 219/552; 219/544
(58) Field of Classification Search ........................ None
See application file for complete search history.

(56) References Cited

U.S. PATENT DOCUMENTS

| | | | |
|---|---|---|---|
| 3,768,156 A | 10/1973 | Caird et al. | |
| 4,526,952 A | 7/1985 | Zeitler et al. | |
| 4,587,037 A | 5/1986 | Munstedt et al. | |
| 4,636,331 A | 1/1987 | Sako et al. | |
| 4,661,689 A * | 4/1987 | Harrison | 219/528 |
| 4,910,388 A * | 3/1990 | Lorenz et al. | 219/543 |
| 4,966,675 A * | 10/1990 | Steininger | 204/290.07 |
| 5,111,025 A | 5/1992 | Barma et al. | |
| 5,229,582 A | 7/1993 | Graham | |
| 5,344,696 A | 9/1994 | Hastings et al. | |
| 5,516,189 A | 5/1996 | Ligeras | |
| 5,624,750 A * | 4/1997 | Martinez et al. | 428/344 |
| 5,961,869 A * | 10/1999 | Irgens | 219/549 |

(Continued)

FOREIGN PATENT DOCUMENTS

DE 2148191 4/1973

(Continued)

*Primary Examiner*—Thor S Campbell
(74) *Attorney, Agent, or Firm*—Martin Fleit; Paul D. Bianco; Fleit Gibbons Gutman Bongini & Bianco PL

(57) ABSTRACT

A heating device having a layer containing electrically conductive plastic. The layer exhibits adhesive characteristics at least in some sections on at least one side. A heatable object equipped with a heating device of this type. The layer containing electrically conductive plastic is connected to at least one component of an object. A radiant heating system including a support and a heating layer containing electrically conductive plastic, whereby the heating layer is formed by a flexible film and the support is also flexible. Methods to produce such products and apparatus.

36 Claims, 12 Drawing Sheets

U.S. PATENT DOCUMENTS

| | | |
|---|---|---|
| 6,172,344 B1 | 1/2001 | Gordon et al. |
| 6,194,692 B1 | 2/2001 | Oberle |
| 6,353,207 B1 | 3/2002 | Burt |
| 6,541,744 B2 * | 4/2003 | Von Arx et al. ............. 219/544 |
| 7,053,344 B1 * | 5/2006 | Surjan et al. ................ 219/549 |
| 7,250,586 B2 * | 7/2007 | Diemer et al. .............. 219/217 |

FOREIGN PATENT DOCUMENTS

| | | |
|---|---|---|
| DE | 2616771 | 11/1976 |
| DE | 3316182 | 11/1984 |
| DE | 3321516 | 12/1984 |
| DE | 3524631 | 1/1986 |
| DE | G 8523328.5 | 1/1987 |
| DE | 69101703 | 10/1994 |
| DE | 29808842 | 9/1998 |
| DE | 19711522 | 10/1998 |
| WO | WO 99/66766 | 12/1999 |

* cited by examiner

Fig. 5a
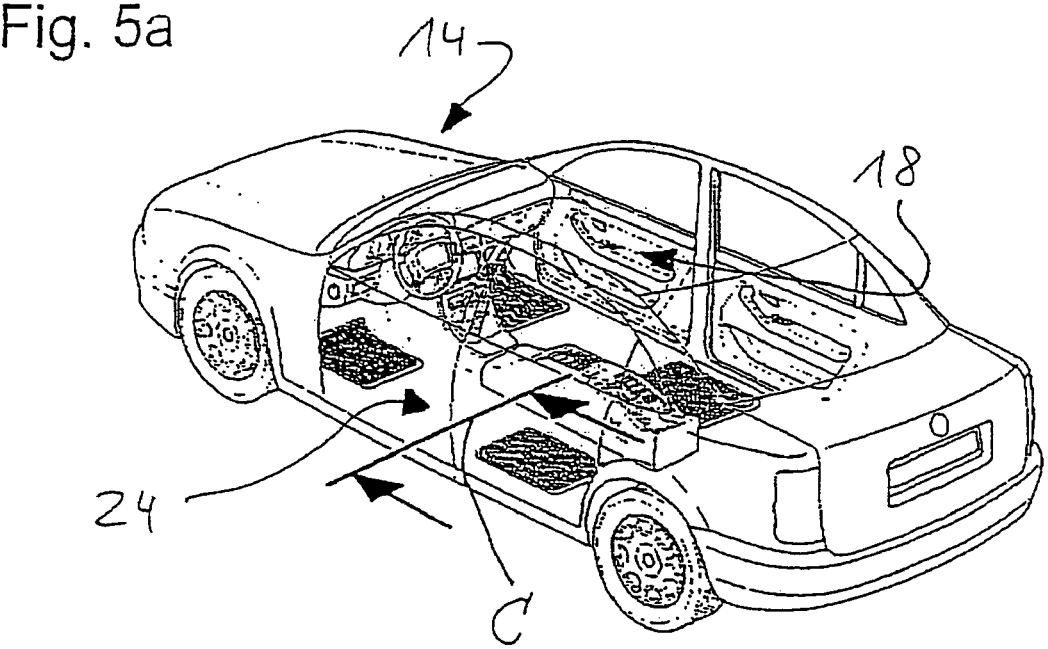
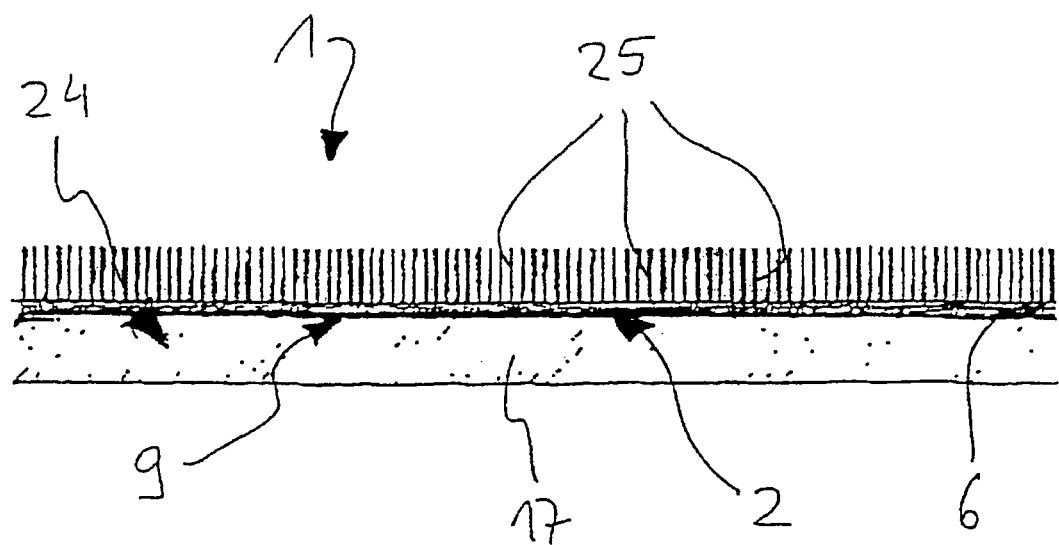
Fig. 5b

Fig. 6a
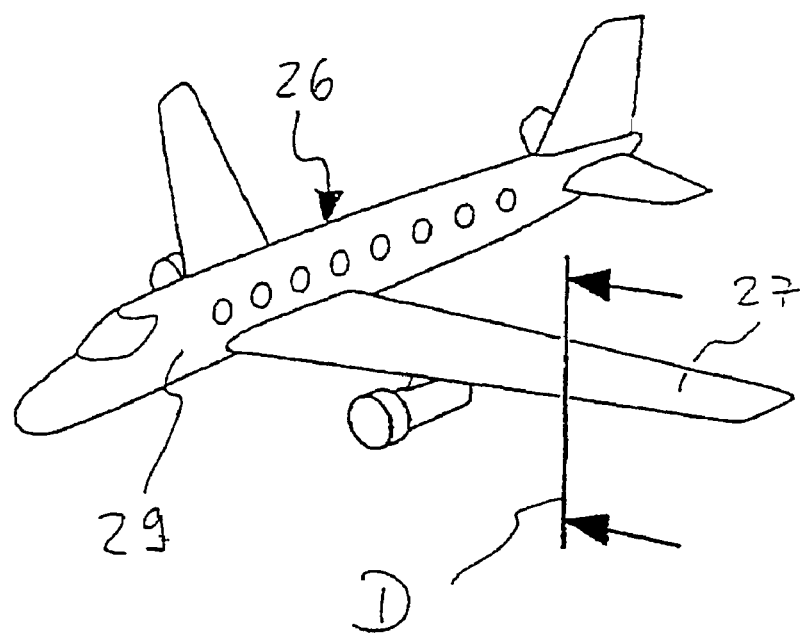
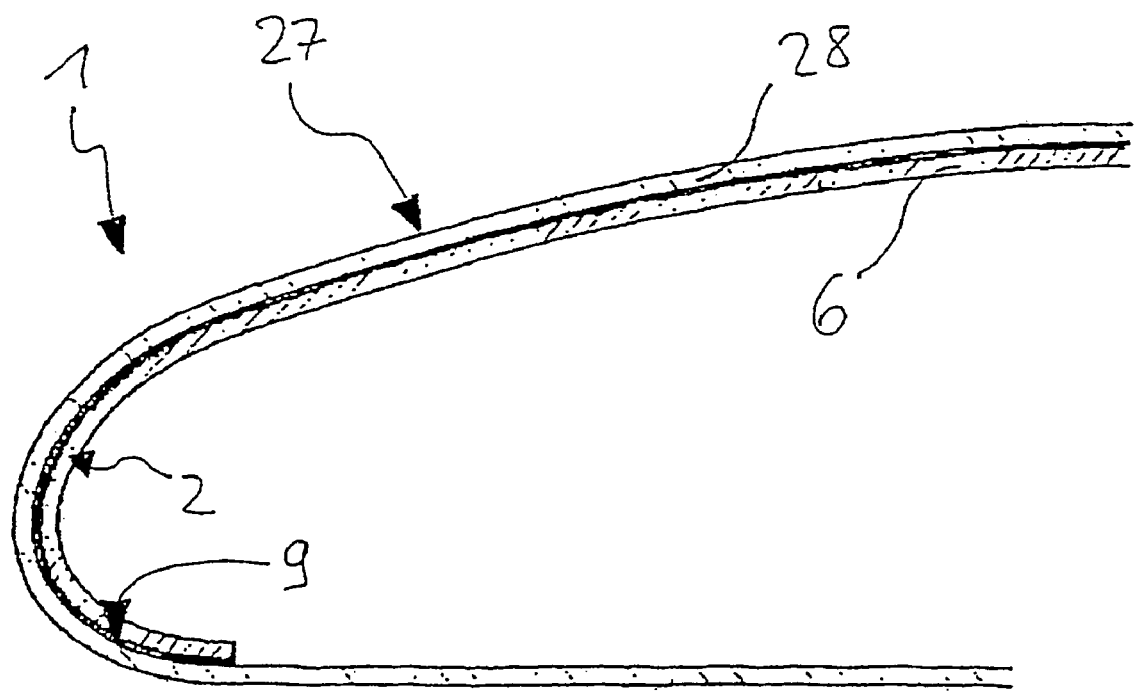
Fig. 6b

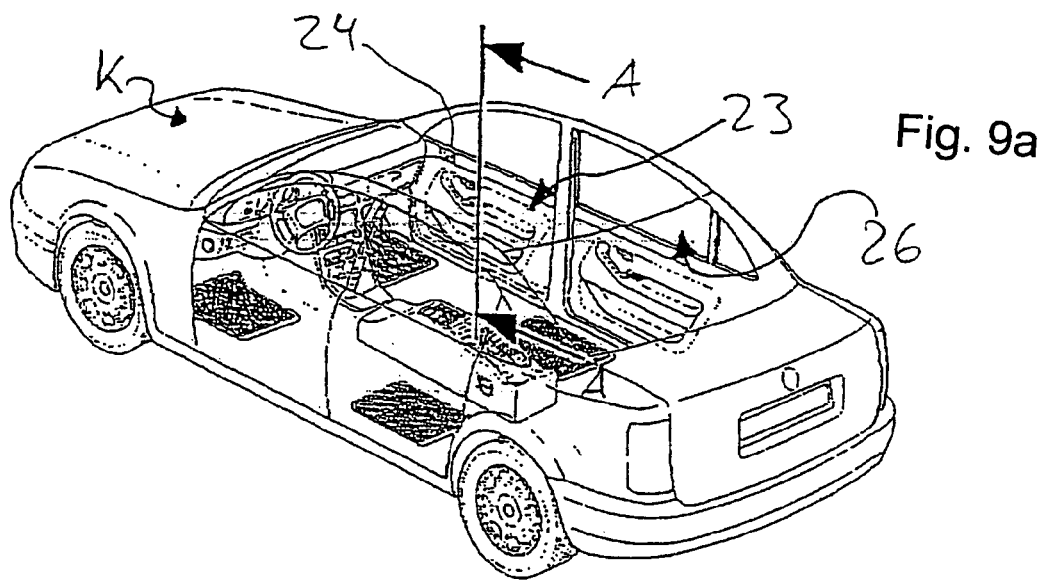
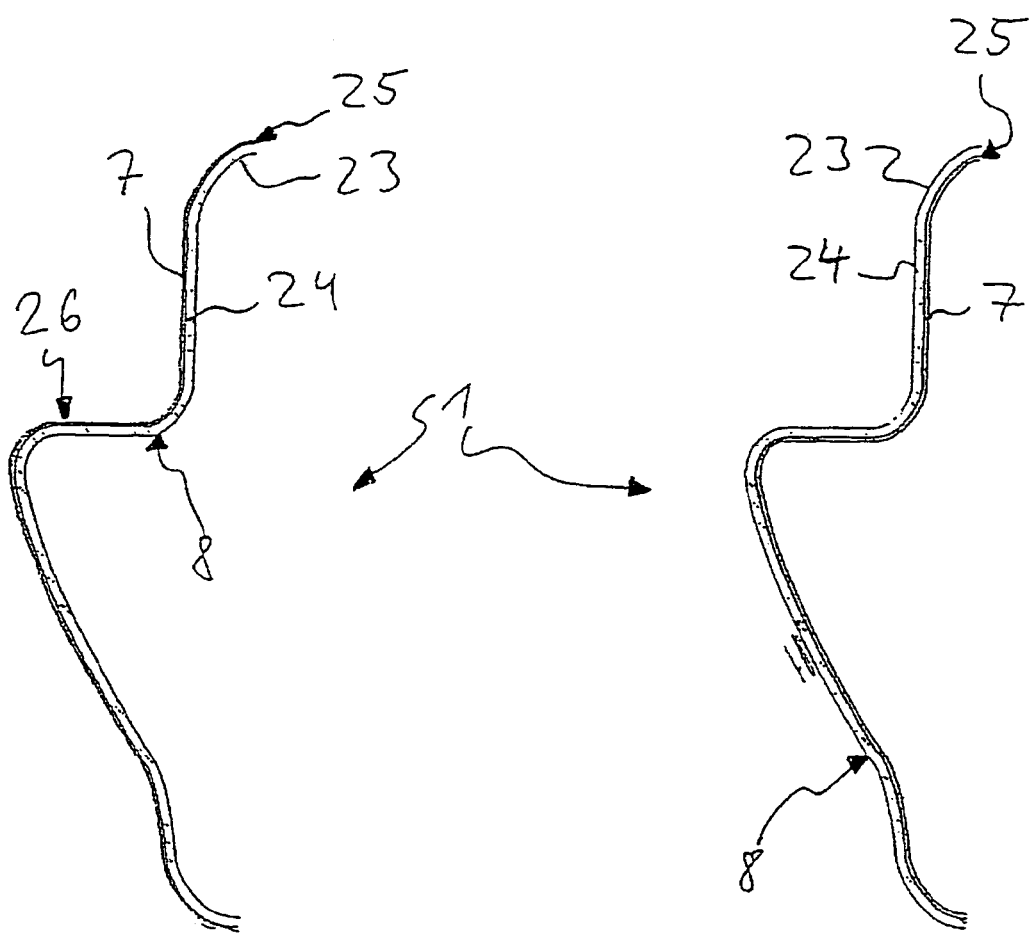
Fig. 9b                                    Fig. 9c

Fig. 11a
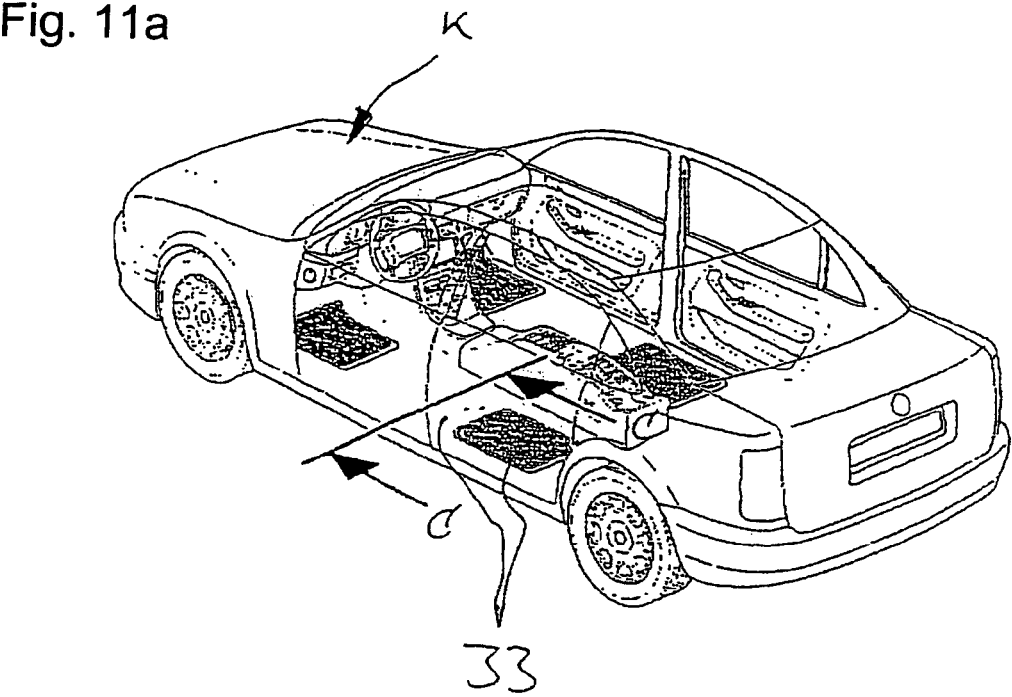
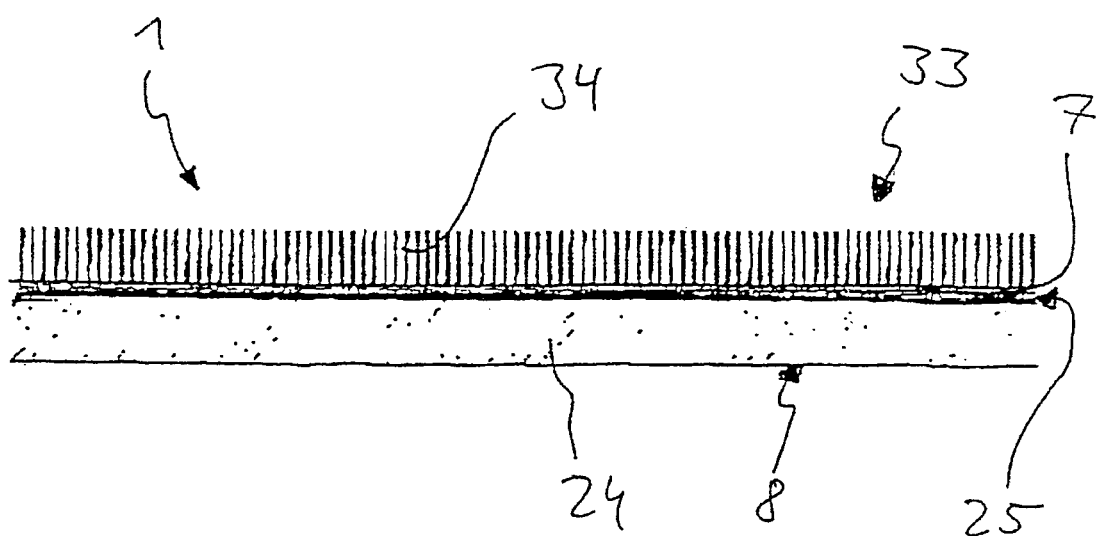
Fig. 11b

HEATING DEVICE AND METHOD FOR THE PRODUCTION THEREOF AND HEATABLE OBJECT AND METHOD FOR PRODUCING SAME

RELATED APPLICATION

This application is a continuation of International Application No. PCT/DE03/01309, filed Apr. 22, 2003, the contents of which are here incorporated by reference in their entirety, and a continuation-in-part of application Ser. No. 10/464,822, filed Jun. 18, 2003, now U.S. Pat. No. 7,250,586 which is a continuation of International Application No. PCT/DE01/04879, filed Dec. 21, 2001, the contents of which are here incorporated by reference in their entirety. The benefits of 35 USC Sec. 120 are claimed.

BACKGROUND OF THE INVENTION

1. Field of the Invention

The invention concerns a heating device, a method for the production of a heating device, a heatable object and a production method for such an object.

2. Prior Art

In numerous operational areas, electrical heating means are used to bring objects to desired temperatures. As a result of their good adjustability and simple design, resistance heating is preferred. The use not only of conductive materials but also, among others, electrically conductive plastic for this purpose is known. This opens up an additional broad design area for corresponding heating devices, particularly when contrasted with the limitations of ordinary metal conductive materials.

From DT 26 16 771 A1, a composite heating panel, made of a plastic laminate, with an incorporated semiconducting layer is known, which provides directed radiant heat. This laminate consists of a rigid plastic laminated structure, which is formed from at least one layer of a reinforced substrate basic material and a resin coating on this material, a semiconductive carbonaceous pyropolymer, which is bound to a heat-resistant, inorganic oxide support of large surface area, which is incorporated on at least one side of at least one layer of the substrate material, a heat-reflecting layer, incorporated in a position on one side of the pyropolymer on the substrate material, and power supply devices to parts of the layer made of conductive, carbonaceous pyropolymer, and which produces electrical resistance heating in the laminate, which is reflected and radiated by the heat-reflecting layer of the composite element. Such heating panels will be used as part of a wall of a living room or an office.

In this state of the art, the incorporation of the semiconducting layer into the laminate can take place in that finely comminuted carbonaceous pyropolymer, in the form of small particles or as powder, is mixed with a suitable support or vehicle in such a way that it is applied, spread or otherwise brought to the surface of a resin-coated glass cloth, paper, felt, cardboard, etc., as the laminated substrate or on a wood veneer, which is used in the laminated panel. The finely comminuted carbonaceous pyropolymer can also be mixed with the resin or polymer material, with which a specially reinforcing base material is to be impregnated or which is to be applied on this base material as a coating, wherein this base material is applied in or on the substrate by immersion or coating, and the resulting coated substrate is subjected to a semi-hardening of the type that the semiconductive pyropolymer leads to a uniform impregnation and coating via the resulting semicured, laminated sheet.

DE 33 16 182 A1 discusses the use of molded articles, such as films, plates, or spatially molded structures, from the class of the pyrrole polymers, which are complexed with anions, as electrical heating elements, in particular, for the heating of corrosive liquids or gases. The molded articles can also be coated with organic plastics.

A polymeric composite heating element is described in DE 35 24 631 A1 and has the form of a film, tube, or rod. Such polymeric composite heating elements can be used as such as heating sources, or can be laminated with conventional plastic films in order to improve the material strength.

The use and production of electrically conductive thermoplastic polyurethanes are known from DE 33 21 516 A1. Corresponding products are suitable for, among other things, the production of 1- to 2-mm-thick films for surface heating elements.

Thus, heating devices with electrically conductive plastic are rudimentarily known, but the entire state of the art does not contain any data or suggestion concerning how such heating devices are to be equipped and produced so that they can be used in actual practice.

Therefore, the problem of the present invention concerns the design of a heating device with an electrically conductive plastic and the corresponding object with the least possible expense.

SUMMARY OF THE INVENTION

The problem is solved by the heating device as described herein, the method for the production of a heating device as described herein, the heatable object as described herein, and the production method for said object as described herein. Other preferred and advantageous developments of the invention result from other descriptions herein and combinations thereof.

The invention therefore concerns a heating device with a layer containing electrically conductive plastic whereby the layer containing electrically conductive plastic has adhesive properties at least in some sections of at least one side.

Preferably, the layer containing electrically conductive plastic has an adhesive agent for imparting adhesive characteristics at least in some sections of at least one side. In a preferred refinement, the layer containing electrically conductive plastic has an adhesive agent at least in some sections on both sides.

Preferably, the adhesive agent is a glue, and in particular, the layer is a gluing tape.

As an alternative to the preceding refinements of the invention, the layer can also be an adhesive agent layer, where the adhesive agent layer is preferably a glue layer. Such a glue layer can consist for example, of a layer of glue that contains carbon or carbon particles in order to impart electrical conductivity.

In accordance with another variant of the invention which can advantageously be used, the layer containing electrically conductive plastic and perhaps the adhesive agent is/are essentially transparent or at least in some sections. Such a heating device according to the invention can also be used advantageously for disks and the like.

Furthermore, it is advantageous and therefore preferred that the adhesive agent be curable. According to a refinement thereof, provision can be made, in particular, so that the cured adhesive agent remains at least essentially cured when the temperature is raised.

In another development of the invention, the electrically conductive plastic contains polyurethane.

Within the framework of the invention, a method is provided for the production of a heating device which contains a layer containing electrically conductive plastic, whereby an adhesive agent is applied on at least one side of the layer containing electrically conductive plastic, Preferably, this method is further developed in that an adhesive agent is applied on both sides of the layer containing electrically conductive plastic.

In order to make possible a particularly simple use of a heating device produced in accordance with the invention, the heating device can be in the form of sheets or tape material. In accordance with a refinement thereof, a desired form of the heating device is cut or punched from sheets or tape material before the heating device is attached to an object by means of an adhesive agent.

It is advantageous for the further processing and use of the heating device in accordance with the invention if its production method provides that the adhesive agent be covered with a removable protective layer after the layer containing electrically conductive plastic is applied.

In an alternative method in accordance with the invention for the production of a heating device, which contains a layer containing electrically conductive plastic, an adhesive agent can be mixed with electrically conductive plastic and the mixture applied as a layer on a surface.

The invention also concerns a heatable object with a heating device, as was indicated above as lying within the framework of the invention, whereby the layer containing electrically conductive plastic exhibits adhesive characteristic at least in some sections of at least one side, by means of which the layer containing electrically conductive plastic is connected to at least one component of the object.

In an alternative heatable object with a heating device according to the invention, the layer containing electrically conductive plastic exhibits adhesive characteristics at least in some sections of both sides, and other components of the object are connected by means of the adhesive characteristic of the heating device.

Both variants of the heatable objects in accordance with the invention, which were indicated in the preceding, can be further developed in that the layer containing electrically conductive plastic is present by means of the adhesive characteristic in only one section of the other component or the other components of the object. As an alternative, provision can be made in embodiment examples so that the layer containing electrically conductive plastic is present, at least essentially, over an entire section of the other component of the object.

Furthermore, the invention concerns a method for the production of a heatable object, which contains a heating device with a layer containing electrically conductive plastic, whereby the layer containing electrically conductive plastic exhibits adhesive characteristics at least in some sections of at least one side, and that the layer is then placed with its side with adhesive characteristics at least on one other component of the object.

The previously described method can also provide that adhesive characteristics are produced on the layer containing electrically conductive plastic, at least in some sections on both sides, and that the layer is then placed, with each of its sides with adhesive characteristics, on one other component of the object, so as to attach to the two other components. Furthermore, the adhesive characteristics can at the same time or instead be produced on the complete surface of the layer containing electrically conductive plastic.

Preferably, the adhesive characteristics exhibited by the layer containing electrically conductive plastic are produced by application of adhesive agents on the corresponding side of the layer containing electrically conductive plastic.

In another solution in accordance with the invention for a method for the production of a heatable object, which contains a heating device with a layer containing electrically conductive plastic, an adhesive agent is first mixed with electrically conductive plastic; this mixture is then placed on a first component of the object; and the first component is subsequently connected to a second component by means of the mixture of adhesive agent and electrically conductive plastic.

Preferably, the adhesive agent can be cured after the final contact with the other component of the object.

As additional advantages, a good, simple, and operationally reliable construction and a good heat distribution are made possible with the invention.

The invention also concerns a surface heating system comprising a support and a heating layer, which contains electrically conductive plastic, whereby the heating layer is formed by a flexible film and the support is also flexible.

Such a radiant heating system is further developed within the framework of the present invention in that the support comprises a layer, in particular, a woven or nonwoven fabric, preferably a natural or synthetic fibrous nonwoven fabric. As an alternative, the support can be a molded article made of elastic material, for example, as seat upholstery of the seat surface part or the back of a seat, or a mattress.

Preferably, the heating layer contains polyurethane, single-component polyurethane, cross-linked single-component polyurethane, a PU foam, UV-resistant and/or hydrolyzable or vapor-permeable plastic material. However, other electrically conducting or conductive foaming and foamed materials can also be used, where plastic materials are preferred. As an alternative or in addition, it is preferred that the electrically conductive plastic of the heating layer contain graphite, preferably in powdered form.

The surface heating system can be designed so that the contact ends of the power supply wires within the heating layer or between the support and the heating layer are in contact with the latter. Preferably, the contact ends of the power supply wires are affixed, by means of the heating layer itself, to the latter, or are sewed or adhered to the heating layer and/or the support.

Furthermore, the heating layer can be formed directly by spraying, rolling, or spreading on the support. Alternatively, the heating layer can be adhered, sewed, or soldered or affixed in some other way to the support.

Preferably, a manually and/or electrically/electronically actuatable and/or automatic current control is also provided, which can be connected to a current source and to which power supply wires are connected, whose contact ends are in contact with the heating layer.

The invention, moreover, concerns a heatable object which contains a surface heating system in accordance with the preceding developments.

Within the framework of a preferred development, said object is a seat surface part or the back of a seat or the upholstery of a seat or a flat piece of furniture, especially a mattress, and the heating layer is anatomically adapted to the upper thigh-buttocks parts or back parts of the user. The latter is advantageously attained in that the heating layer is anatomically formed in the plane of the seat surface part or the back or the upholstery of a seat or flat piece of furniture, especially a mattress, in that it is present or electrically conductive only in accordance with anatomical specifications.

Alternatively or in addition, the heating layer for the anatomically adapted heat release can have a corresponding thickness profile.

Another preferred development of the heatable object consists in an upholstered cover, particularly of a motor vehicle. Such a heatable object can be designed for a heat release that varies over its surface.

In general, the heating layer for the heat release that varies over its surface can be profiled over the extent of its surface and/or thickness.

Finally, the present invention also concerns a method for the production of a surface heating system, wherein a heating layer containing electrically conductive plastic is connected to a support. In accordance with the invention, the heating layer is formed by first applying an electrically conductive material, especially foaming or foamed plastic, on the support and then curing the plastic material on the support. A preferred refinement of this method consists in that before the application of the electrically conductive material, especially foaming or foamed plastic on the support, the contact ends of power supply wires are first placed on the side of the support on which the plastic material is subsequently applied.

Alternatively, in the method in accordance with the invention for the production of a surface heating system, wherein a heating layer containing electrically conductive plastic is connected to a support, the heating layer can be produced from an electrically conductive material, especially foaming or foamed plastic, and then is placed on the support. Preferably, after its placement on the support, the heating layer can be connected to the support in such a way that it does not slip. This is preferably accomplished in that the heating layer is sewed, adhered, or soldered to the support.

Preferably, but without restriction, electrically conductive polyurethane is used as the plastic material.

The method can be further developed in that the contact ends of the power supply wires are placed on the heating layer and/or the support so that the composite support and heating layer are in contact with the latter. To this end, the contact ends of the power supply wires are preferably sewed or adhered to the heating layer and/or the support.

Another development of the method in accordance with the invention consists in that the heating layer is profiled over the extent of its surface and/or thickness during or after its production. This can take place during the production of the heating layer directly on the support, for example, by means of patterns that determine the surface form of the heating layer. If the heating layer is produced separately—that is, not directly on the support—then its form can be obtained, for example, within the form-giving framework or by punching out. Also the thickness can be varied over the surface of the heating layer.

Preferred and advantageous refinements can be deduced from the dependent claims and combinations thereof and the entire disclosure content of these documents, including technical knowledge and the state of the art, particularly if it is indicated in the introduction of this description.

For example, the electrically conducting plastic material of the heating layer can contain carbon or carbon particles so as to impart electrical conductivity. Moreover, the material of the heating layer is such that it remains at least essentially cured during or after a temperature elevation, following the heating effect, and also, moreover, remains dimensionally stable and undamaged. As already mentioned, polyurethane (PU) is preferably used for the electrically conductive plastic, but basically all other materials disclosed in the state of the art indicated in the beginning can also be used if they can be foamed. Other material data and technical background are disclosed, for example, in publications DE G 85 23 328.5, DE 298 08 842 U1, DE 197 11 522 A1, and DE 691 01 703 T2, whose contents are hereby referenced in their entirety in the documents under consideration so as to avoid mere repetition.

BRIEF DESCRIPTION OF THE DRAWINGS

The invention is explained in more detail below with reference to embodiment examples, which are indicated in the drawings, where:

FIGS. 5a and 5b schematically show a sixth embodiment example of an object with a heating device, in a perspective overview representation and a sectional view, in the form of a floor covering of a motor vehicle; and FIGS. 6a and 6b schematically represent, within the framework of a seventh embodiment example, application of the invention to an airplane wing, in a perspective overview representation and a sectional view.

FIGS. 9a, 9b, and 9c show second and a third embodiment examples of a surface heating system, in accordance with the invention, schematically, in a perspective overview representation or a sectional view, in combination with an inside cover of a motor vehicle;

FIGS. 11a and 11b schematically show a fifth embodiment example of an object with a surface heating system in a perspective overview representation or a sectional view in the form of a floor cover of a motor vehicle;

DETAILED DESCRIPTION OF PREFERRED EMBODIMENTS OF THE INVENTION

In the following description of the invention, with the aid of embodiment examples, the same reference symbols are used throughout for the same or similarly functioning parts. Even if not all details of the graphic representations are discussed in the following description, the individual features and their connections can be readily deduced from the figures themselves by an expert in the field if they are represented in the figures.

Figure 1:
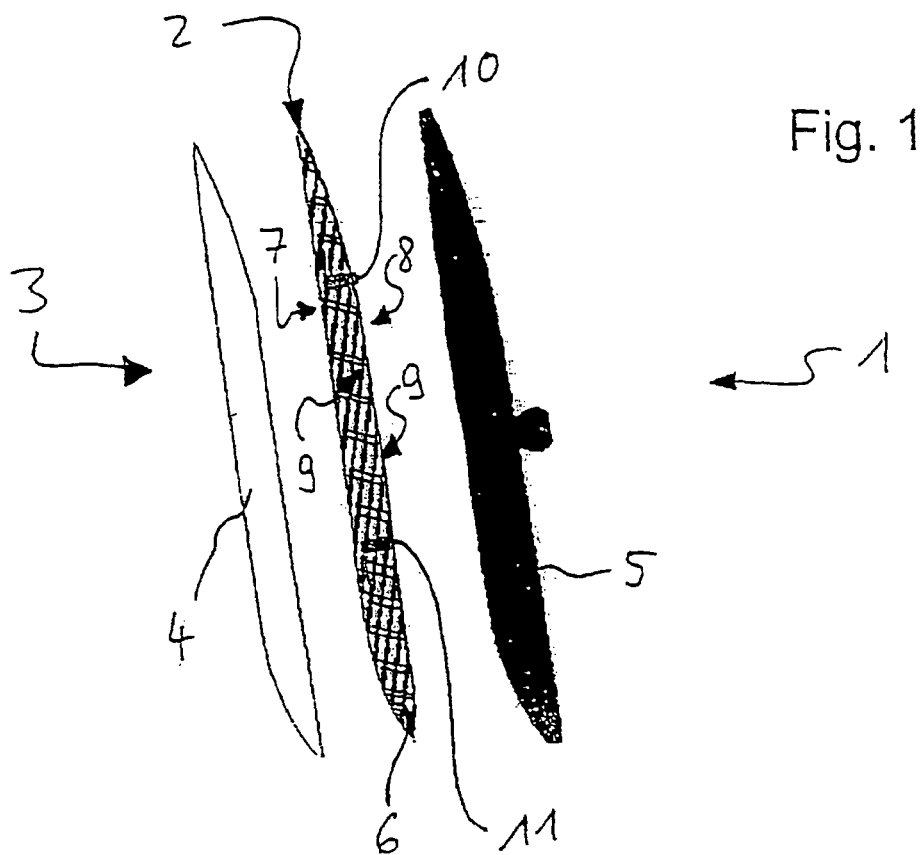
FIG. 1 shows a schematic perspective view of a first embodiment example of an object with a heating device in the form of the outside mirror of a motor vehicle.

As a first embodiment example of a heatable object 1 with a heating device 2, a heatable outside mirror 3 of a motor vehicle (not shown) is shown in FIG. 1. The outside mirror 3 contains a mirror plate 4 and a plastic cover 5 as a support. A layer 6 is provided therebetween, which contains electrically conductive plastic, such as polyurethane, and thus represents a heating device 2, which can be operated electrically. Furthermore, the layer 6 exhibits adhesive characteristics on both sides 7 and 8. To this end, the two sides 7 and 8 are provided with an adhesive agent 9, which is formed by a glue in the example shown. The layer 6 can therefore also be regarded as a double-sided adhesive layer, which simultaneously has electrical conductivity so that it can be heated electrically. The layer 6, which is shown in FIG. 1, can be, for example, a double-sided adhesive film. Furthermore, electrical connections are shown schematically in FIG. 1 in the form of conductor ends 10 and 11 on the layer 6, via which the latter is connected to a current source (not shown), in a preferably controllable manner. The electrical connections 10 and 11 can be introduced therein or placed thereon, depending on the thickness of the layer 6.

Figure 2:
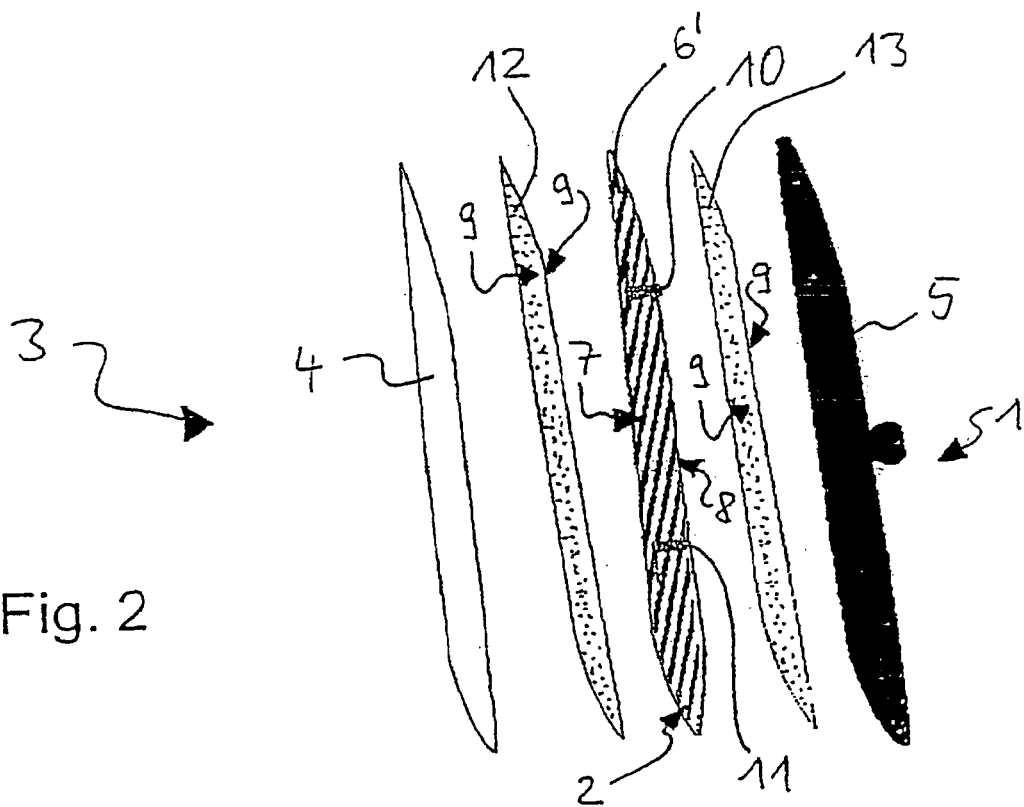
FIG. 2 represents prior art and is a schematic representation of an object analogous to FIG. 1, with a heating device in the form of an outside mirror of a motor vehicle, according to the state of the art, in a perspective view.

The advantage of the first embodiment example of the invention, according to FIG. 1, is clear, especially in comparison to the construction according to the state of the art, which is shown in FIG. 2 (prior art) in an analogous manner.

As can be seen in FIG. 2, in a heatable outside mirror 3 for a motor vehicle, according to the state of the art, double-sided adhesive layers 12 and 13 are provided, in addition to the mirror plate 4 and the plastic cover 5 and the layer 6' lying therebetween, with electrically conductive plastic, by which means, on the one hand, the mirror plate 4 is connected to the layer 6' with electrically conductive plastic, and on the other hand, the latter is connected to the plastic cover 5. In actual practice, the electrical heating layer 6' of the state of the art is provided on both sides with the double-side adhesive layer 12 and 13 before assembly between the mirror plate 4 and the plastic cover 5.

The two adhesive layers 12 and 13 are not required in an outside mirror 3, in accordance with the invention. By means of the invention, not only can the two adhesive layer 12 and 13 be dispensed with, but the assembly expense of such an outside mirror 3 is also reduced since the two adhesive layers 12 and 13 need not be placed on the layer 6', which leads to additional savings. The advantage of the embodiment example according to FIG. 1 therefore lies in the particularly skillful use of the layer 6 as both, on the one hand, the heating layer, since it contains electrically conductive plastic, and on the other hand, as the double-sided adhesive layer, which connects the mirror plate 4 and the plastic cover 5.

Within the framework of the invention, it is also possible if, in the embodiment example of FIG. 1, the plastic cover 5 itself contains the electrically conductive plastic and its surface facing the mirror plate 4 is provided with the adhesive characteristic, in that an adhesive agent 9, such as, in particular, a glue, is applied there. In this variant, the plastic cover 5 itself functions as a heatable and adhesive layer. Thus, a separate, double-sided glue layer can be omitted, which leads to corresponding savings in the assembly. Since only one glue layer is required, compared to two layers in the example according to FIG. 1, glue can also be saved.

In another alternative of the embodiment example of FIG. 1, the layer 6 itself consists only of a glue that contains electrically conductive plastic, which, when the outside mirror 3 is assembled, is applied directly on the plastic cover 5 or the mirror plate 4. This development makes possible the use of previously common and readily producible plastic covers 5 and mirror plates 4, without changes, with simultaneous savings in the production and assembly of the double-sided glue layer. Also, a dimensional adaptation of a double-sided glue layer with a heating characteristic need not be carried out, which further rationalizes the production process of the outside mirror 3.

The glue used as the adhesive agent 9 in the preceding embodiment examples has such characteristics that it is cured after joining the parts between which it is applied. So that the bond thereby produced is as long-lasting as possible, it is advantageous if the glue does not soften again when the layer 6 is heated. To what extent the latter feature is absolutely necessary depends on the characteristics of and the demands placed on the heatable object 1 or at least its heating device 2 in the concrete embodiment case.

If, as is frequently the case, individual components, for example, of the previously described outside mirror 3 for the assembly are delivered by external suppliers, it may be advantageous if the optionally prefabricated layer 6 is first provided with a protective layer(s) (not shown) on its/their side(s) provided with the adhesive agent. In this way, for example, the form of the layer 6 can also be made, in accordance with requirements, from uniform tape or sheet material, for example, by punching or cutting. However, in other embodiments, the layer 6 can be supplied, rolled up on rollers, to the production process of the object 1, wherein, then, either the form and dimensions of the tape material are held within the dimensions of the object to be provided with it, or after bringing together the tape material with at least one component, such as the plastic cover 5, are cut out. If the layer 6 is formed only during the completion of the object 1, then shaping measures for the layer 6 can be omitted, in that a corresponding adhesive agent 9 is simply applied to a surface of a component, such as the mirror plate 4, of the object 1, so that a surface-covering placement of the layer on the corresponding component of the object 1 is achieved in a particularly simple manner.

In each of the previously described variants, the electrical contacts or terminals can be placed before or after the bonding of the layer 6 to another component of the object 1 in the layer 6, or between the layer 6 and the other component of the object 1, especially without requiring a separate operation. To affix the electrical terminals to the layer with electrically conducting plastic, suitable devices can also be provided on the layer which make possible the wrapping, soldering, attachment, insertion, clamping, etc. of electrical conductors.

FIGS. 3a, 3b, and 3c, 4a and 4b, and 5a and 5b show additional embodiment examples of heating devices in motor vehicles.

Figure 3A:
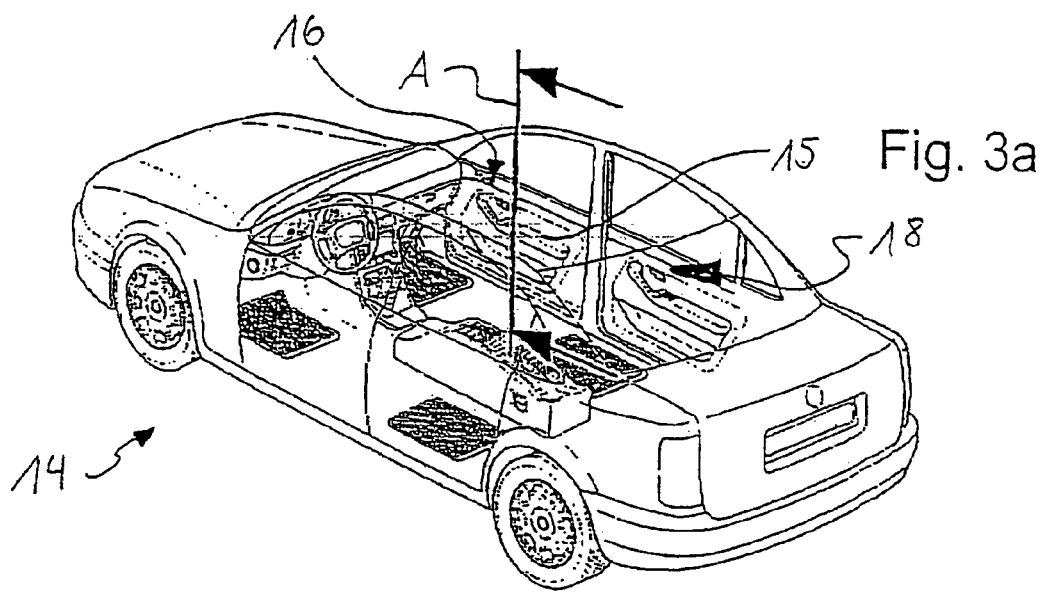
FIGS. 3a, 3b, and 3c schematically illustrate second and third embodiment examples of an object with a heating device, in a perspective overview representation and a sectional view, in the form of other inside lining covers of a motor vehicle.

FIG. 3a shows a motor vehicle 14 in a sectional drawing, in which a sectional plane A through an inside cover 15 of a motor vehicle door 16 is schematically shown. The schematic sectional view of the inside cover 15 in the sectional plane A, in accordance with the arrows shown in FIG. 3a, is shown as a second embodiment example of a heatable object 1 with a heating device 2 in FIG. 3b. This inside cover contains a support layer 17, on which the layer 6 containing electrically conductive plastic is applied by means of an adhesive agent 9. Since the visible surface of the inside cover 15 is formed by the layer 6 containing electrically conductive plastic, the free visible side 7 of the layer 6 containing electrically conductive plastic can be provided with decoration (not shown), for example, a synthetic leather-like appearance, so as to attain a pleasant exterior of the inside cover 15.

Figures 3B, 3C:
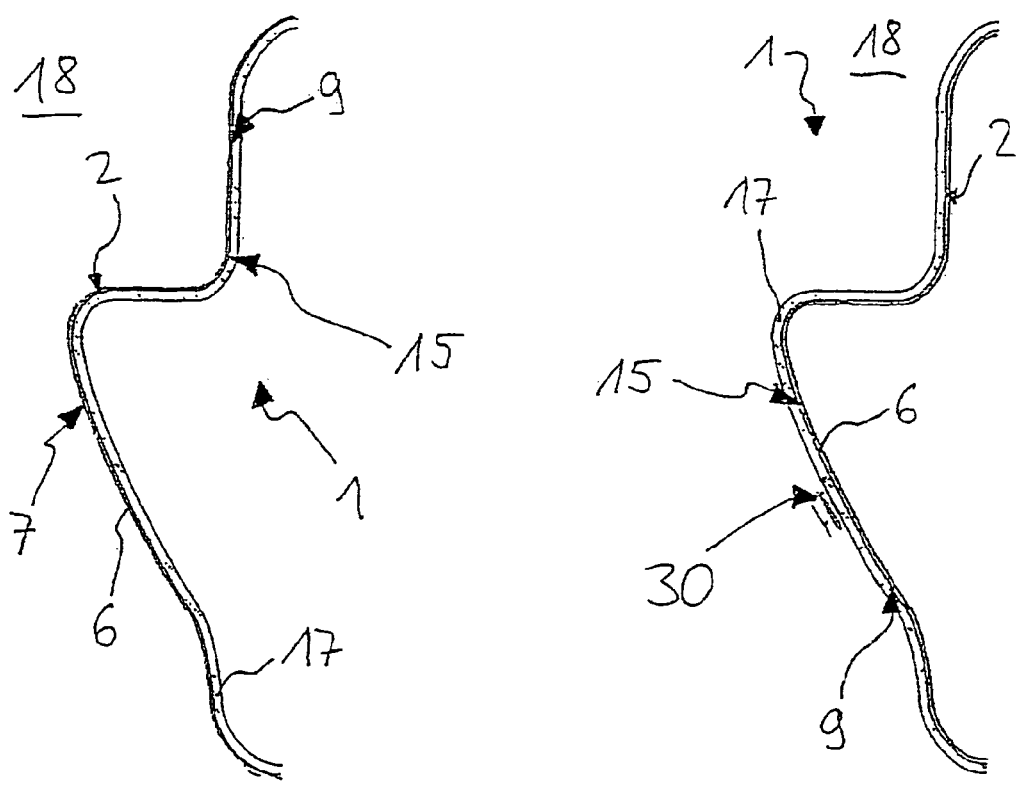

As an alternative to the embodiment example described in the preceding, in a variant thereof, which is shown in FIG. 3c in a sectional view, the layer 6 containing electrically conductive plastic can be placed by means of the adhesive agent 9 on the side of the support layer 17, which is turned away from the interior space 18 of the motor vehicle 14. In such a case, either the support layer 17 itself can be provided on its visible side with a decoration (not shown), or a decoration 30 (only partially visible for better clarity) can be placed on the visible side of the support layer 17.

The principle of the two embodiments just described can also be applied to the entire passenger space 18 of the motor vehicle 14; for example, motor vehicle seats for implementing or supporting a seat-heating system, roof cover, rear window shelf, column covers, consoles, steering wheel, carpeting, air ducts, especially inside for the preferred preheating of cold air, and many other applications, can be used as heatable objects with heating devices which contain a layer 6 containing electrically conducting plastic, for improving the climate of the passenger space of a motor vehicle. In this way, it is not only possible to design the conventional heating units, but also a quicker and more uniformly distributed and intentional heating of the entire interior space 18 of a motor vehicle 14 can be affected. Other concrete embodiment examples of this are illustrated in FIGS. 4a and 4b and 5a and 5b.

Figure 4A:
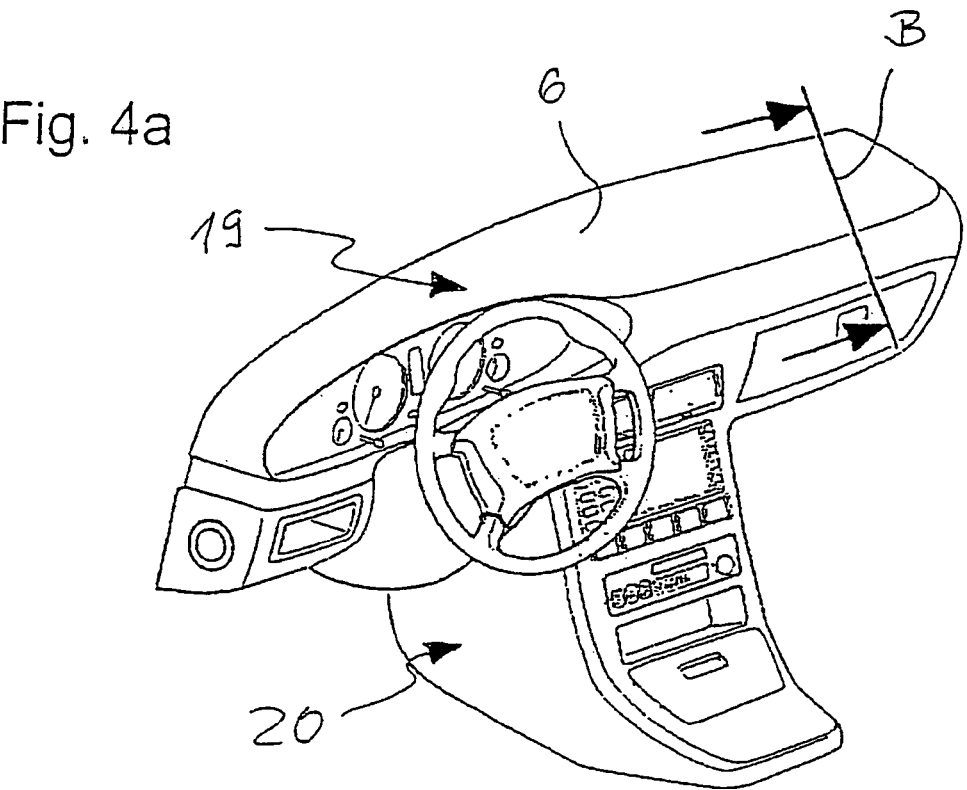
FIGS. 4a and 4b schematically show an inside lining cover and a windshield of a motor vehicle, as fourth and fifth embodiment examples of objects with a heating device, in a perspective overview representation and a sectional view.
Figure 4B:
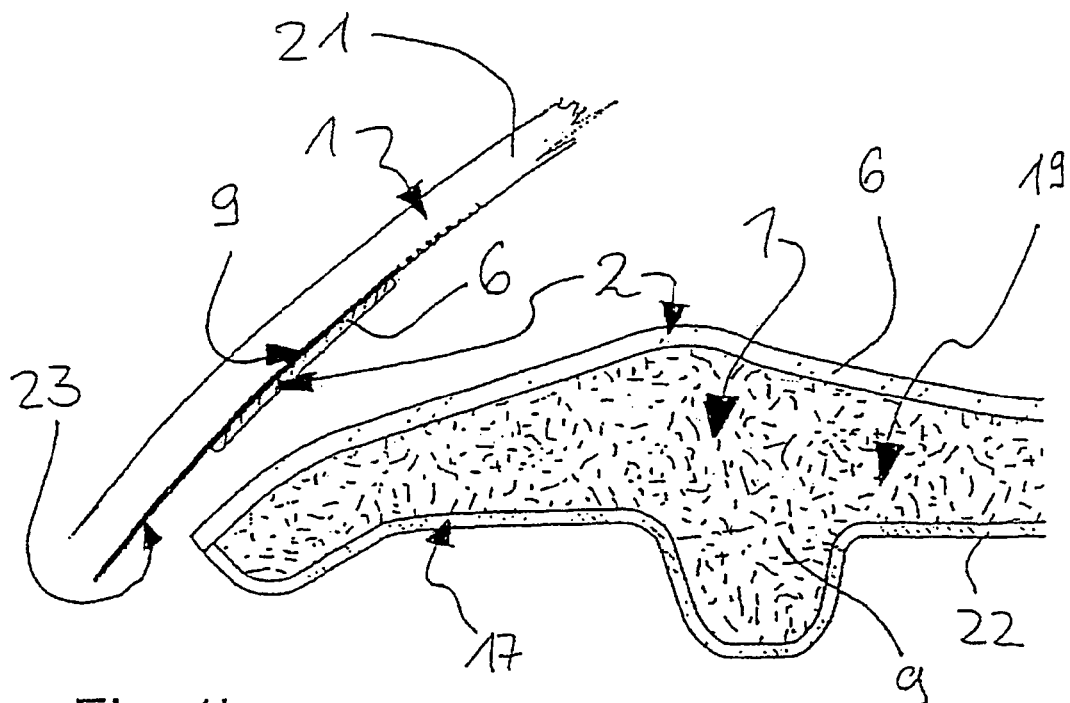

FIG. 4a shows the position of a cutting plane B in a perspective view of a dashboard 19 and a console 20, wherein the line of sight to the cutting plane is illustrated in accordance with the representation in FIG. 4b by arrows. FIG. 4b is the sectional view through the dashboard 19 in the cutting plane B, wherein a part of an adjacent windshield 21 of the correspondingly equipped motor vehicle 14 is also shown in a sectional view. The layer 6 containing electrically conductive plastic forms the plastic skin with which the dashboard 19 is covered and which forms its surface. By means of an adhesive agent 9, which is formed in the fourth embodiment example under consideration by a filling material, such as foam, the layer 6 containing electrically conductive plastic is bonded to a support layer 17 used as a holder 22. The layer 6 containing electrically conductive plastic thereby forms a skin with embedded conductive material. As an alternative, the layer 6 containing electrically conductive plastic could also be covered with a decorative layer (not shown) in this embodiment example, approximately analogous to the variant which is shown in FIG. 3c.

A windshield 21 is shown in a partial sectional view in FIG. 4b as another embodiment example of a heatable object 1. In the area of its circumference, this windshield 21 is provided with a black ceramic layer 23, which, for example, can be put in place by silk screen. Furthermore, a layer 6 containing electrically conductive plastic is placed, directly or by means of an adhesive agent 9, such as glue, on the windshield 21 in the area of the ceramic layer 23. By this development, for example, a surrounding additional and/or separate heating of the windshield 21 for the prevention of the formation of fog, the removal of fog, or deicing can be implemented. Furthermore, such a heating device 2 can be provided, especially in the area of the rest position of the windshield wiper blades (not shown), so as to implement here an additional and/or separate heating of the windshield 21, so that damage to the solidly frozen windshield wiper blades (not shown) can be avoided when the windshield wiper (not shown) is activated.

If the layer 6 containing electrically conductive plastic is made of transparent material, then a transparent area of a glass panel, such as a windshield 21, can also be provided with a corresponding heating device 2. In this way, the fog on a glass panel equipped in such a manner can also be removed or prevented and ice can be thawed. The heating conductors used in the past, for example, with rear windows could then be omitted or dimensioned smaller.

As another variant for the interior space heating of a motor vehicle 14, the shaping of carpet material 24 as heatable objects 1 is clarified in FIGS. 5a and 5b. In this sixth embodiment example, which is clarified in a partial sectional view in FIG. 5b, which can be seen on cutting plane C in FIG. 5a, according to the arrow direction, the structure of such carpet material 24 is shown. The layer 6 containing electrically conductive plastic is bonded to a lower support layer 17 by means of the adhesive agent 9.

The filaments, loops, or general fibers/threads 25, which form the upper side of the carpet material 24, can thereby be affixed either on the support layer 17 and go through the layer 6 containing electrically conductive plastic, placed directly only on the layer containing electrically conductive plastic, or proceed from a separate layer (not shown), which is bonded to the layer 6 containing electrically conductive plastic by means of an adhesive agent 9. In the latter case, the support layer 17 can also be omitted.

Within the framework of the present invention, it is possible also for the layer 6 containing electrically conductive plastic to be formed directly by the support layer 17, or for the layer 6 containing electrically conductive plastic to be affixed to the support layer by means of the filaments, loops, fibers or threads 25 which form the upper side of the carpet material 24. Furthermore, it is possible to place the layer 6 containing electrically conductive plastic on the underside of the support layer 17, using an adhesive agent 9, so that conventional carpet material 24 can still be made in the usual manner and subsequently can be provided with the heating device 2. It is thus also possible to equip existing carpet material 24 with a heating device 2.

As already mentioned, it is possible to realize a desired heating or warming effect with the corresponding heated objects by connecting the layer 6 containing electrically conductive plastic to a power supply (not shown). Since the electrical resistance of the layer 6 is constant, the heating temperature can be determined or regulated by the supplied electrical power. In an advantageous manner, the possibility exists of using both DC and AC, particularly without the generation of electrical smog. Since such generated heat is also exclusively radiant heat, a certain temperature and heating comfort is produced.

When using natural raw materials, such as wood fibers, sisal, material from banana trees, coconut fibers, etc., an odor formation in wet weather and bacterial infestation often present great problems. If, as in the previously described embodiment examples, inside lining parts are designed so that they can be heated, an avoidance of such an odor formation and a bacterial infestation can also be achieved in combination effect with the purely heating effect.

Other concrete examples for heatable objects 1 with heating devices 2, according to the present invention, include, for example, a diesel tank made of plastic, wherein thickening of diesel fuel at low outside temperatures can be avoided in that a minimum temperature can be maintained; an oil sump, which can be used for the preheating of motor oil for the better and more efficient operation of the engine; an entire engine space, which makes possible a preheating of the engine; and, for example, a loading space both in private automobiles as well as freight vehicles. In this way, heating devices 2 can be used advantageously in the interior space and in the outside areas of motor vehicles.

The present invention, however, is not limited to use in the field of motor vehicles. All previously mentioned embodiment examples and variants and analogous uses can also be used, for example, with vehicles with two wheels, in the railroad field, and with ships and airplanes.

An example of this is shown in FIGS. 6a and 6b. FIG. 6a serves to clarify a sectional plane D in the area of a wing 27 of an airplane 26, wherein the line of vision of the sectional view of FIG. 6b is again clarified by arrows. The sectional view itself of a part of the airplane wing 27 is shown in FIG. 6b. The airplane wing or the support surface 27 has an outside skin 28 on whose inside is placed a layer 6 containing electrically conductive material. The affixing of the layer 6 containing electrically conductive material on the outside skin 28 of the support surface 27 is carried out with an adhesive agent 9. The electrically conductive layer 6 makes possible a heating of the support surface 27 from the inside, so that icing of the support surface cannot occur. Aside from the carrying surfaces 27, the airframe 29 of the airplane 26 (see FIG. 6a) can also be heated in a similar manner and thus be protected from icing. With propeller airplanes (not shown), an expensive electronic heating (not shown) against icing can be replaced, for example, by using a heating device 2, in accordance with the invention, on the propeller (not shown). Particularly in the field of aircraft, but also with other applications of the present invention, the present invention can also make unnecessary or at least greatly reduce deicing fluid, which can get into the soil or air, so that the present invention also makes a contribution to environmental protection.

As already mentioned, numerous other areas of application of the present invention are possible; thus, for example, motorcycles and mopeds and the like, benches and service elements can be equipped with corresponding heating devices. Other application possibilities exist, for example, in the household (coating of plastic wallpaper, wood covers, wood floors, carpets, tiles, sheathings for heating and water pipes, floor heatings), with clothing and the like (shoes, boots, ski boots, work clothes, protective clothing, gloves, electric blankets, heating covers, for example, in the clinical field, heating containers), in sports and leisure (artificial turf playing fields, the underside of tents, sleeping supports in tents), and in the military (among other applications, preheating in a motor vehicle so that the engine will start better in the winter).

Especially aliphatic and aromatic polyurethanes are mentioned here merely as preferred electrically conductive plastic materials or plastic materials which can be made electrically conductive.

In regard to the production of a heating device or an object in accordance with the invention, it is thus preferred that the layer be produced with or from electrically conductive plastic in a spray or immersion method or by roller application. A corresponding coating is preferably provided during a method for the production of a heating device or an object with it. In this way, the invention makes possible, in particular, an adaptation or selection of the coating method also with respect to the configuration of the form to be coated and/or the number of units to be produced.

In the example and comparative embodiments discussed in the preceding, the layer thickness of the electrically conducting layer is preferably between approximately 0.05 mm and about 0.3 mm. If the electrically conducting layer is also to fulfill a function as a visible surface, it is preferable that the thickness be greater. In particular, it is also possible within the scope of the present invention to adapt the layer thickness as a function of the requirement or the requirement profile to the heating device or the requirements of the heating device or to the object or the requirements of the object, which can be easily determined by a careful consideration or by conducting experiments. For example, a layer thickness of 1.2 mm is provided if a surface layer with an additional function is involved, such as the inside cover of a vehicle.

With reference to the other figures of the drawing, the invention is further explained below with the aid of design possibilities.

In the following description of the invention, with the aid of embodiment examples, the same reference symbols are used throughout for the same or similarly acting parts. Even if not all details of the graphic representations are discussed in the following description, the individual features and their connections can be readily deduced by an expert in the field from the figures themselves, if they are represented in the figures.

As a first embodiment example of a surface heating system 1, a motor vehicle seat 2, with a seat heating system 4 integrated in its seat surface part 3, is shown in FIGS. 1aa and 1ab in a sectional or perspective schematic drawing.

Figure 7A:
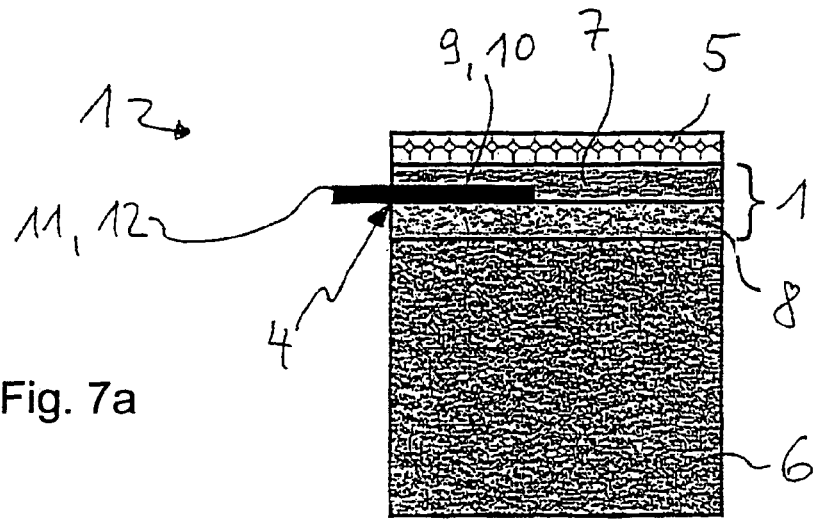
FIGS. 7a and 7b schematically show in a sectional or perspective, partial view, a first embodiment example of the invention in connection with a motor vehicle seat with a seat heating.

The structure of the seat surface part 3 in the vicinity of the surface heating system 1 is shown in FIG. 7a, in which a cross-sectional part through the corresponding layers/components of the seat surface part 3 is shown. The surface of the seat surface part 3 is formed by a seat cover 5, which can be made of fabric, synthetic leather, or leather or other suitable materials or combinations thereof. The form of the seat surface part 3 is formed, at least essentially, by an elastic foam molded article 6. The components of the seat heating system 4 are placed between the elastic foam molded article 6 and the seat cover 5.

The seat heating system 4 is formed by the surface heating system 1, which contains a heating layer 7 and a support 8. The support 8 is a flexible layer made of a fibrous nonwoven fabric with natural and/or synthetic fibers. The heating layer 7 is made of a flexible, electrically conducting synthetic foam, such as electrically conductive polyurethane, from which a film or a foil is formed, so that a surface skin is produced. The film does not have any recognizable pores but can also be closed-cell or closed-porous in its structure. In particular, the material is UV-resistant and/or hydrolyzable or vapor-permeable, so as to be used in a seat or flat piece of furniture upholstery, in accordance with the most preferred use. In this way, an optimal climatization through the substrate is secured for the user.

The material for the formation of the film, such as UV-resistant and hydrolyzable or vapor-permeable, cross-linked single-component polyurethane, is, for example, applied by spraying on the fibrous nonwoven fabric so that a so-called spray flush [sic] or a spray skin is formed by this so-called spray flush method. As an alternative, the film could also be formed on the seat cover 5 or the elastic foam-molded article 6 by this method. The material could be sprayed also into the foam mold for the elastic foam-molded article 6, before the introduction of the foam material for it, so as to bond with the latter during its hardening. During a production of the film by spraying, it is possible, for example, to adjust the thickness of the film very precisely by the duration of the spraying, and the thickness can be optionally varied over its course. Alternately, the film can also be produced by rolling or spreading the corresponding material, in particular on the support 7, but also separately, and then optionally can be bonded to the support 7, the seat cover 5, or the elastic foam-molded article 6.

Figure 7B:
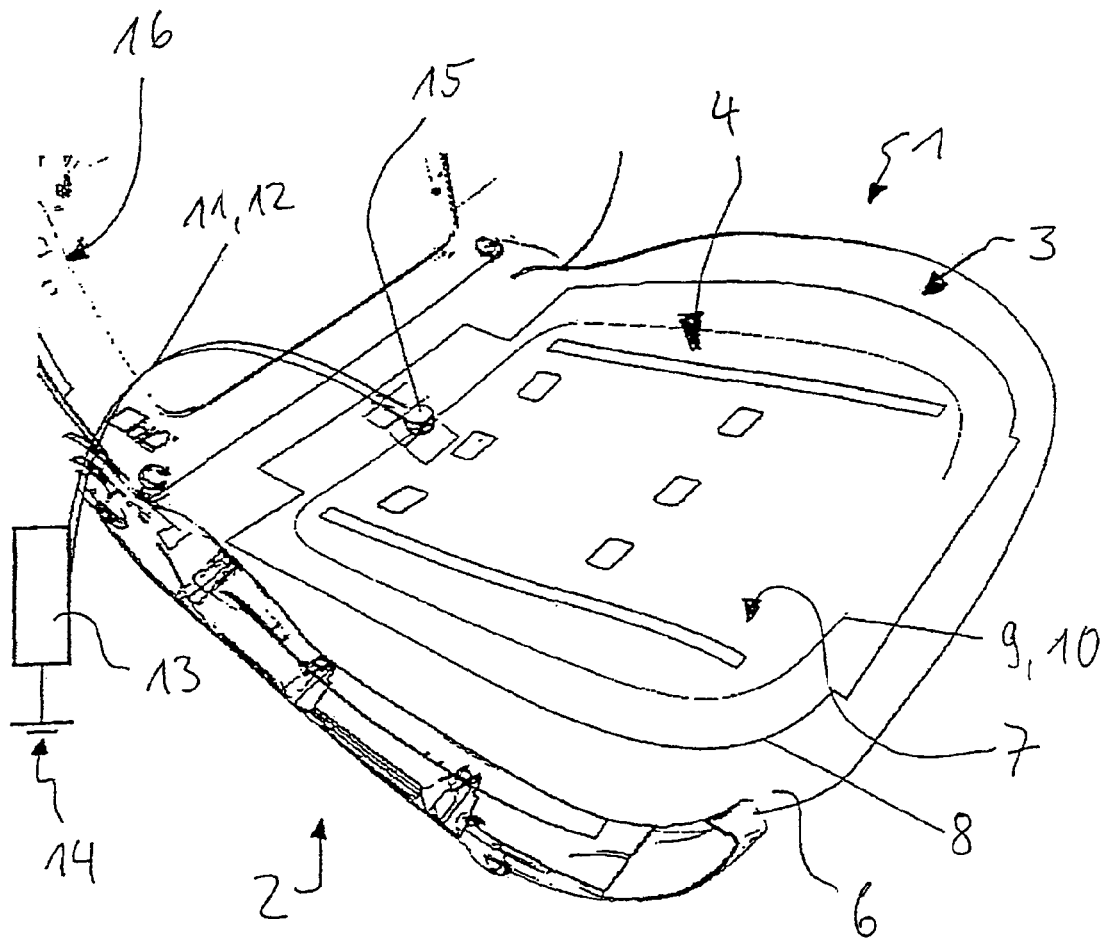

Contact ends 9 and 10 of the power supply wires 11 or 12 are placed at the edge of the heating layer 7, between the heating layer 7 and the support 8 in such a way that they are in electrically conducting contact with the heating layer 7 (see also FIG. 7b).

For the production of the surface heating system 1 of the first embodiment, still-flowable or liquid electrically conductive polyurethane material, which, for example, contains carbon particles, is applied, as previously explained in more detail, by rolling, spreading, or spraying on the fibrous nonwoven fabric of the support 8, after the contact ends 9 and 10 of the power supply wires 11 or 12 were suitably placed on the fibrous nonwoven fabric of the support 8. After hardening of the electrically conductive polyurethane foam, it is flexible and in electrically conductive contact with the contact ends 9 and 10 of the power supply wires 11 and 12 and forms the heating layer 7. The contact ends 9 and 10 of the power supply wires 11 and 12 can be held alone inherently by the bond forces between the polyurethane foam and the fibrous nonwoven fabric. For further securing the attachment, the contact ends 9 and 10 of the power supply wires 11 and 12 can still be sewed together with the composite (not shown). In this variant, the electrically conductive PU layer of the heating layer 7 at the same time also represents an adhesive or glue layer.

Instead of forming the heating layer 7 directly on the fibrous nonwoven fabric of the support 8, the heating layer 7 can also be formed separately and be brought together with the support 8 in the cured but flexible state. The attachment between the heating layer 7 and the support 8 is effected, for example, by cementing, sewing, or soldering, depending on which process can be applied as a function of the materials used. It is not mandatory for the contact ends 9 and 10 of the power supply wires 11 and 12 to lie between the support 8 and the heating layer 7, but rather they can also be brought together with the heating layer 7 on the side of the heating layer facing away from the support 8 in order to obtain an electrically conductive contact.

The fibrous nonwoven fabric of the support 8 can also be a tape material at first, on which the heating layer 7 is formed, shaped on the full surface or according to the configuration required for the seat surface part, or on which the prefabricated heating layer 7 is also placed as a tape material or parts shaped according to the configuration required for the seat surface part 3, and bonded with it. Subsequently, the desired individual pieces can be produced according to the configuration required for the seat surface part 3 by punching out, for example. However, it is also possible to produce the fibrous nonwoven fabric first in the configuration required for the seat surface part 3 and to form the heating layer 7 on it, which can also be prefabricated beforehand, according to the configuration required for the seat surface part 3. The contact ends 9 and 10 of the power supply wires 11 and 12 can be inserted in a correspondingly suitable way during production of the composite of the support 8 and the heating layer 7, or placed on the composite that is at least joined together for a suitable attachment.

In FIG. 7b, the first embodiment of the surface heating system 1 is further illustrated in a schematic oblique view, omitting the seat cover 5. The path of the contact ends 9 and 10 of the power supply wires 11 and 12 can be easily seen. Furthermore, a current control 13 and a current source 14 for the control or operation of the surface heating system 1 are schematically shown. The current control 13 can be actuated manually and/or electrically/electronically and/or be automatic. In actual practice, the current control 13 is the normal control for heating up the motor vehicle space or a part thereof, or a separate control. The power supply wires 11 and 12 are connected to the current control 13 and end, more or less, in their respective contact ends 9 and 10. Ahead of the contact ends 9 and 10, a functional unit 15, for example, can also be provided in the power supply wires 11 and 12, which can involve, for example, a separate seat occupancy sensor, a heat sensor or temperature probe, a distributor, and many other things.

The support 8 could also be formed by other materials and structures, such as a woven fabric, instead of a fibrous nonwoven fabric. The support 8 could also be a molded article, however, such as, for example, the elastic foam-molded article 6 itself from the first embodiment according to FIGS. 7a and 7b.

i) Suitable materials for the heating layer—that is, the electrically conductive foam material—are specified in the cited documents, in particular with regard to their physical characteristics, and moreover they are well known to technical experts and are also indicated, for example, in the prior art referenced in the cited documents. It is therefore unnecessary to discuss them in more detail, but rather they are included herein by reference to all suitable materials, in particular from the older publications, indicated or referenced in the cited documents.

Although it is not explained in the preceding and it is also not shown in FIG. 7b, the reclining piece of furniture 16 that is only partially visible in FIG. 1ab can also be equipped with a surface heating system 1. Furthermore, all similar objects, such as mattresses or other upholstery in particular, can be equipped with a surface heating system 1 according to the invention. Also, use of the invention with side linings and floor covers, especially in motor vehicles, is preferred.

Figure 8A:
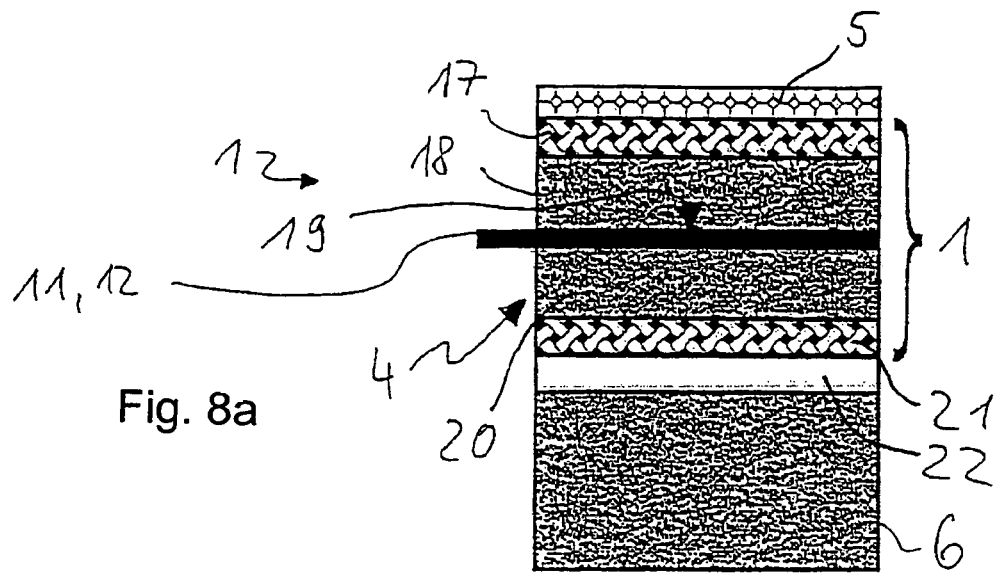
FIGS. 8a and 8b schematically show in a sectional or perspective, partial view, a motor vehicle seat with a seat heating according to the state of the art.
Figure 8B:
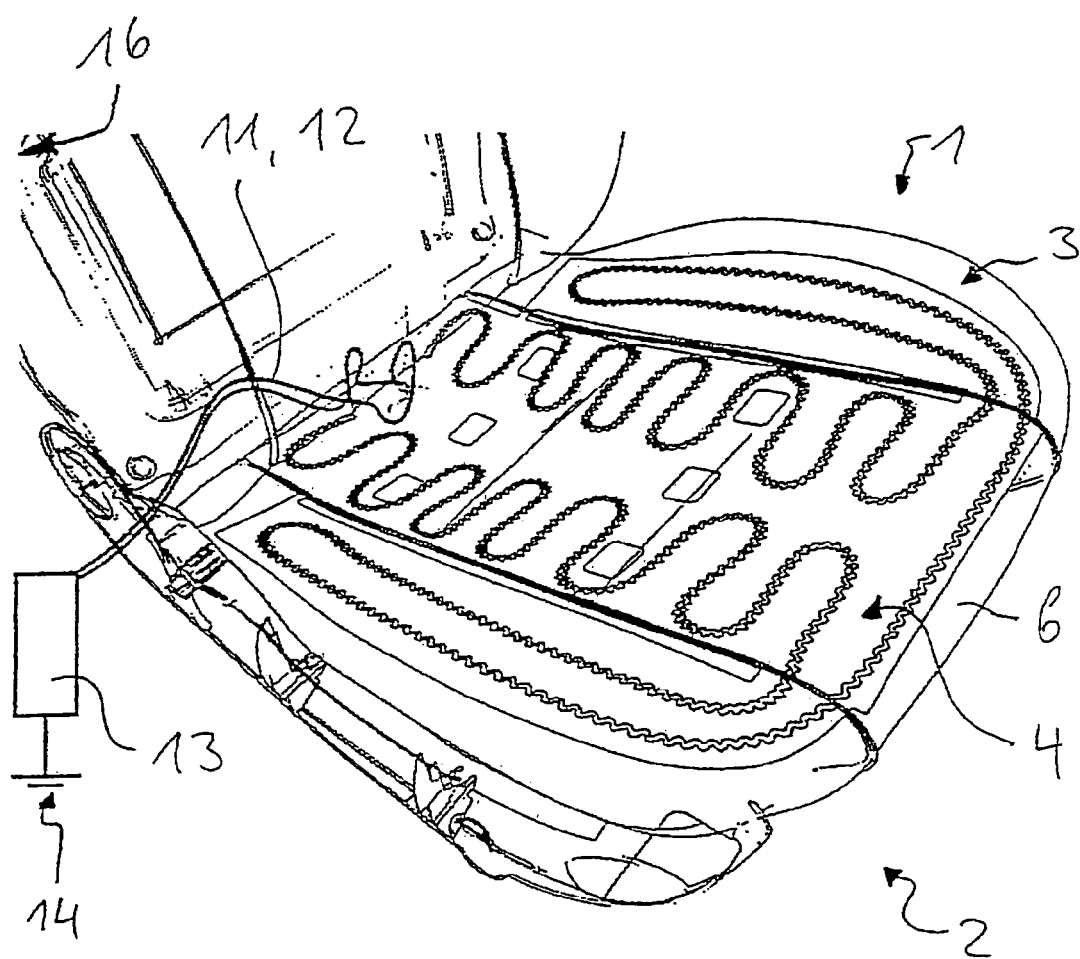

FIGS. 8a and 8b show representations analogous to FIGS. 7a and 7b merely to illustrate the differences between the present invention and the prior art. This previously known surface heating system 1, in the form of a seat heating system 4 for a motor vehicle seat 2, has the seat cover 5 and an elastic foam-molded body 6 in the usual manner, with the surface heating system 1 lying between them.

As clarified by FIG. 8a and considered in order starting from the seat cover 5, the surface heating system 1 in the prior art has an upper fabric layer 17, an upper foam layer 18, a heating wire layer 19, a lower foam layer 20, and a lower fabric layer 21, which are bonded, as a prefabricated composite and by means of an adhesive tape 22 adhering on both sides, in at least a slip-resistant manner with the foam-molded article 6 that forms the actual seat cushion.

In the production of this surface heating system according to the prior art, the fabric layers 17 and 21 are first bonded with the immediately adjacent foam layers 18 or 20 using a flame laminating method.

Embodiments of heating devices in motor vehicles are also shown in FIGS. 9a, 9b, and 9c, 10a and 10b, and 11a and 11b.

FIG. 9a shows a motor vehicle K in a sectional drawing, in which, a cutting plane A through an inside cover 23 of a motor vehicle door 24 is shown schematically. The schematic sectional view of the inside cover 23 in the cutting plane A, according to the arrows shown in FIG. 3aa, is shown as a second embodiment example of a heatable object with a surface heating system 2 in FIG. 3ab. This inside cover 23 contains, as a support 8, a support layer 24, on which the heating layer 7 containing electrically conductive plastic is applied by means of an adhesive agent 25. Since the visible surface of the inside cover 23 is formed by the heating layer 7 containing electrically conductive plastic, the free visible side 26 of the heating layer 7 containing electrically conductive plastic can be provided with a decoration (not shown), for example, a synthetic leather-like appearance, so as to attain a pleasant exterior of the inside cover 23.

As an alternative to the embodiment example described in the preceding, it is possible to place the heating layer 7 containing electrically conductive plastic on the side of the support layer 24, turned away from the inside space 26 of the motor vehicle K, by means of the adhesive agent 25, in a variant of the embodiment, which is shown in a sectional view in FIG. 3ac. In such a case, either the support layer 24 itself can be provided with a decoration (not shown) on its visible side or a decoration 27 (only partially visible for better clarity) can be placed on the visible side of the support layer 24.

The principle of the two embodiment examples just described can also be applied to the entire passenger space 26 of the motor vehicle K, especially if the corresponding parts are upholstered. For example, motor vehicle seats can be used to implement or support a seat-heating system, a roof cover, rear window shelf, column covers, consoles, steering wheel, carpeting, air ducts, especially inside for the preferred preheating of cold air, and many others, as heatable objects with heating devices which contain a heating layer 7 containing electrically conductive plastic, to improve the climate of the passenger space of a motor vehicle. In this way, it is not only possible to design conventional heating units smaller, but also a quicker and more uniformly distributed and intentional heating of the entire inside space 26 of a motor vehicle K can also be effected. Other concrete embodiment examples for this are clarified in FIGS. 10a and 10b and 11a and 11b.

Figure 10A:
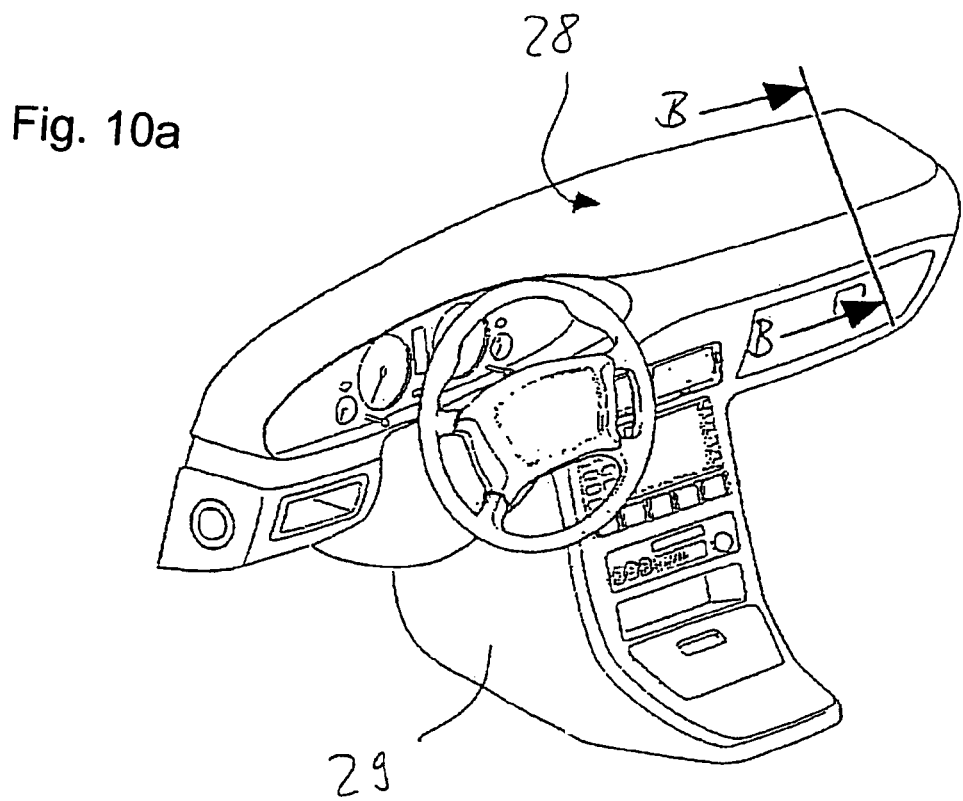
FIGS. 10a and 10b schematically show an inside cover of a motor vehicle as a fourth embodiment example of a surface heating system in a perspective overview representation or a sectional view.
Figure 10B:
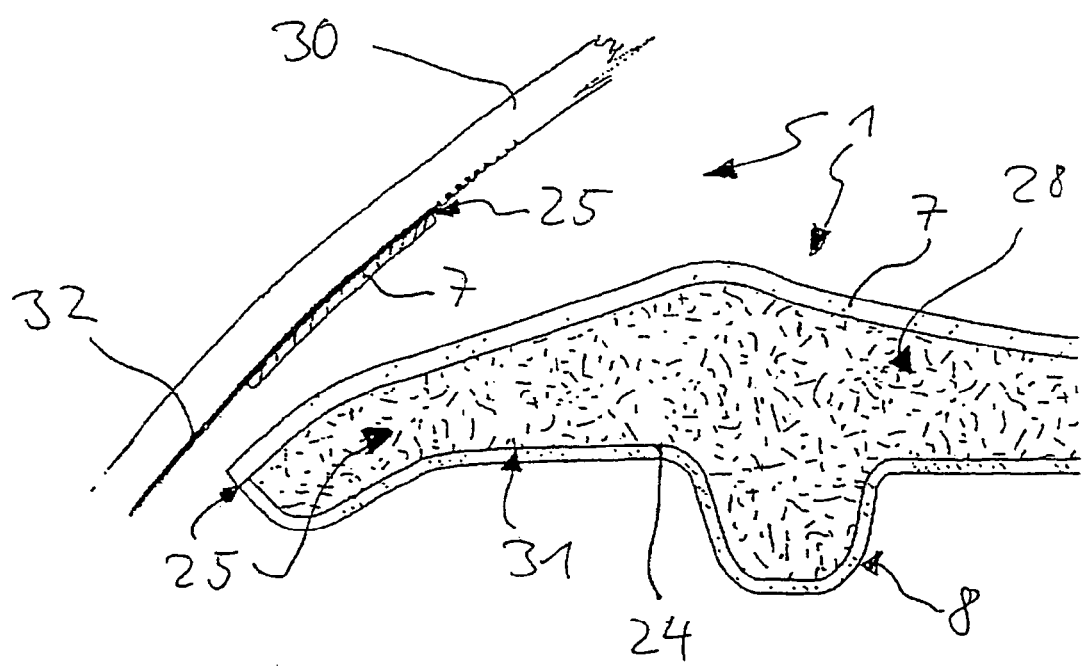

FIG. 10a shows the position of a cutting plane B in a perspective view of a dashboard 28 and a console 29, wherein the line of sight to the cutting plane is illustrated by arrows according to the representation in FIG. 10b. FIG. 10b is the sectional view through the dashboard 28 in the cutting plane B, wherein a part of an adjacent windshield 30 of the correspondingly equipped motor vehicle K is also shown in a sectional view. The heating layer 7 containing electrically conductive plastic forms the plastic skin, with which the dashboard 28 is covered and which forms its surface. By means of an adhesive agent 25, which is formed, in the fourth embodiment example under consideration, by a filling material, such as foam etc., the heating layer 7 containing electrically conductive plastic is bonded to a support layer 24, used as a holder 31, as a support 8. The heating layer 7 containing electrically conductive plastic thereby forms a skin with embedded conductive material. As an alternative, the heating layer 7 containing electrically conductive plastic could also be covered with a decoration layer (not shown), in this embodiment example, approximately analogous to the variant which is shown in FIG. 9c.

FIG. 10b partially shows, in a sectional view, a windshield 30 as another embodiment example of an object with a surface heating system 1. This windshield 30 is provided with a black ceramic layer 32 in the area of its circumference, which, for example, can be applied by silk screening. Furthermore, a heating layer 7 containing electrically conductive plastic is placed in the area of the ceramic layer 32, directly by means of an adhesive agent 25, such as a glue, on the windshield 30. This embodiment can, for example, implement a surrounding, additional, and/or separate heating of the windshield 30 for the prevention of the formation of fog or to remove fog, or to deice. Furthermore, such a surface heating system 1 can be provided, in particular, in the area of the rest position of windshield wiper blades (not shown), in order to implement here an additional and/or separate heating of the windshield 30, so that damage to solidly frozen windshield blades (not shown) can be avoided when the windshield wiper (not shown) is actuated.

If the heating layer 7 containing electrically conductive plastic is made of transparent material, a transparent area of a glass panel, such as a windshield 30, can also be provided with a corresponding surface heating system 1. In this way, the fog on a glass panel thus equipped can also be removed or prevented and also ice can be thawed. The heating conductors used previously, for example, with rear windows (not shown), could then be omitted or made smaller.

As another variant for the inside space heating of a motor vehicle K, the designing of carpet material 33 with a surface heating system 1 is clarified in FIGS. 11a and 11b. In this sixth embodiment example, which is clarified in a partial sectional view in FIG. 11b, which can be seen on cutting plane C in FIG. 11a in accordance with the arrow direction, the structure of such a carpet material 33 is shown. The heating layer 7 containing electrically conductive plastic is bonded to a lower support layer 24 as a support 8 by means of the adhesive agent 25.

The filaments, loops, or general fibers/threads 34, which form the upper side of the carpet material 33, can thereby be affixed on the support layer 24 and go through the heating layer 7 containing electrically conductive plastic, placed directly only on the layer containing electrically conductive plastic, or proceed from a separate layer (not shown), which is bonded to the heating layer 7 containing electrically conductive plastic by means of an adhesive agent 25. In the latter case, the support layer 24 can also be omitted, and the support 8 can be formed by such a separate layer (not shown).

Within the framework of the present invention, it is possible also for the heating layer 7 containing electrically conductive plastic to be formed directly by the support layer 24, or for the heating layer 7 containing electrically conductive plastic to be affixed to the support layer 24 by means of the filaments, loops, fibers, or threads 34, which form the upper side of the carpet material 33. Furthermore, it is possible to place the heating layer 7 containing electrically conductive plastic on the underside of the support layer 24, using an adhesive agent 25, so that conventional carpet material 33 can still be made in the usual manner and subsequently can be provided with the surface heating system 1. It is thus also possible to equip already present carpet material 33 with a surface heating system 1.

As already mentioned, it is possible to realize a desired heating or warming effect with the corresponding heated objects by connecting the heating layer 7 containing the electrically conductive plastic material to a power supply (not shown). Since the electrical resistance of the heating layer 7 is constant, the heating temperature can be determined or regulated by the supplied electric power. In an advantageous manner, the possibility exists of using both DC and AC, particularly without the generation of smog. Since such generated heat is also exclusively radiant heat, a certain temperature and heating comfort is produced.

When using natural raw materials, such as wood fibers, sisal, material from banana trees, coconut fibers, etc., an odor formation in wet weather and bacterial infestation often present great problems. If, as in the previously described embodiment examples, inside coating parts are designed so that they can be heated, an avoidance of such an odor formation and bacterial infestation can also be achieved in combination with the purely heating effect.

Other concrete examples for heatable objects with a surface heating system 1, according to the present invention, include, for example, a diesel tank made of plastic, wherein a thickening of diesel fuel at low outside temperatures can be avoided in that a minimum temperature can be maintained; an oil sump, which can be used for the preheating of motor oil for the better and more efficient operation of the engine; an entire engine space, which makes possible a preheating of the engine; and, for example, a loading space both in private automobiles as well as freight vehicles. In this way, surface heating system 1 can be used advantageously in the interior space and in the outside areas of motor vehicles.

The present invention, however, is not limited to use in the area of motor vehicles. All previously mentioned embodiment examples and variants and analogous uses can also be used, for example, with vehicles with two wheels, in the railroad area, with ships and airplanes.

As already mentioned, numerous other application areas of the present invention are possible, thus, for example: motorcycles and mopeds, and the like, benches and service elements can be equipped with a corresponding surface heating system. Other application possibilities exist, for example, in the household (coating of plastic wallpaper, wood covers, wood floors, carpets, tiles, sheathings for heating and water pipes, floor heatings), with clothing and the like (shoes, boots, ski boots, work clothes, protective clothing, gloves, electric blankets, heating covers, for example, in the clinical area, heating containers), in sports and leisure (artificial turf playing fields, the underside of tents, sleeping supports in tents), and in the military (among other applications, preheating in a motor vehicle so that the engine will start better in the winter).

With regard to the production of a surface heating system or an object in accordance with the invention, it is thus preferred if the layer be produced with or from electrically conductive plastic in a spray or immersion method or by roller application. A corresponding coating is preferably provided during a method for the production of a heating device or an object with it. In this way, the invention makes possible, in particular, an adaptation or selection of the coating method also with respect to the configuration of the form to be coated and/or the number of units to be produced.

In the example and comparable embodiments discussed in the preceding, the layer thickness of the electrically conducting layer is preferably between approximately 0.05 mm and about 0.3 mm. If the electrically conducting layer is also to fulfill a function as a visible surface, it is preferable that the thickness be greater. In particular, it is also possible, within the scope of the present invention, to adapt the layer thickness as a function of the requirement or the requirement profile to the heating device or the requirements of the heating device or to the object or the requirements of the object, which can be easily determined by a careful consideration or by conducting experiments. For example, a layer thickness of 1.2 mm is provided if a surface layer with an additional function is involved, such as the inside cover of a vehicle.

As already indicated, especially preferred specifications for the plastic material of the heating layer 7 are that it contain or be made of polyurethane, preferably cross-linked and/or single-component polyurethane, which, in particular, is UV-resistant and hydrolyzable or vapor-permeable.

A variant in which, simultaneously with the heating of a seat with the placement of the surface heating system 1, an especially weight-dependent seat occupancy recognition is implemented in regard to a particular specialty of the present invention. Such seat occupancy recognitions must currently be implemented separately, so as to carry out, for example, the triggering of an airbag in the case of an accident, only if one passenger sits on a corresponding seat. By the combined implementation of the surface heating system 1 according to the present invention and the simultaneous function of seat occupancy recognition, which can also provide weight-dependent information, so as to accordingly and eventually control the type and frequency of airbag triggering, not only is there a savings in production expenditure, but also in volume and weight in or on the vehicle, in those places where such savings are not otherwise required for the stability and safety of the vehicle.

Figure 12:
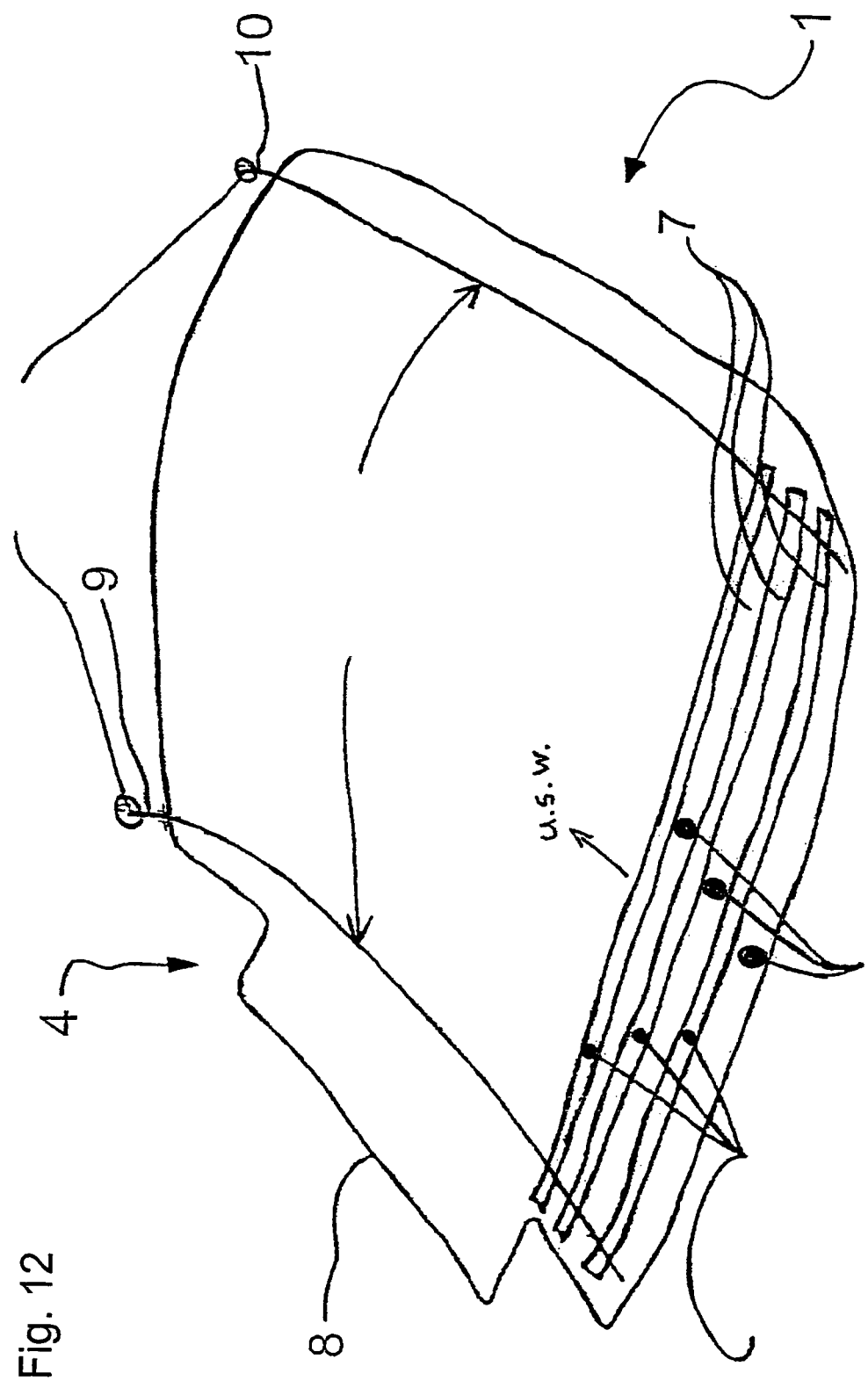
FIG. 12 schematically shows a sixth embodiment example of the invention in a perspective partial view of a motor vehicle seat with a seat heating.

The surface heating system 1 contains, in particular, a strip-like heating layer 7 containing electrically conductive plastic, as is illustrated schematically in FIG. 12. Moreover, all features in accordance with the design according to FIGS. 7a and 7b can be combined with the embodiment example under consideration and are understandable to any expert in the field, so that corresponding descriptions can be omitted here.

i) Although not separately shown in the drawing, one essential application of the present invention is a mattress with a surface heating system in accordance with the invention. In comparison with the prior art, in which there is a so-called electric blanket with metal resistance heating wires, a mattress designed in that way has the advantage that the operating safety is at least substantially improved. With the surface heating system according to the present invention, it is not possible for a fire to occur. In the case of damage to the heating layer, which can also be formed in the shape of strips also, no sparks are produced, as with metal conductors.

ii) Likewise, in the preceding, particularly in connection with the first embodiment example, it was already explained that the heating layer 7 is a film or a foil. Preferably, a paint-like polyurethane layer or a polyurethane paint layer with the indicated physical properties, especially an application of carbon black is used to effect electrical conductivity. Furthermore, it is preferred that a single-component polyurethane material and/or an application of carbon black be used to impart electrical conductivity.

A preferred thickness of the heating layer 7 is from about 0.3 mm to approximately 0.5 mm.

Instead of the spray application of the electrically conductive plastic material on the support, already shown in more detail above, a rolling method can also be used, for example. Liquid polyurethane, for example, is applied on a roller and released on a substrate, such as the support or an external substrate. The distance of the roller circumferential surface from the substrate determines the thickness of the heating layer. After the solidification or curing of the polyurethane, a paint film with the desired properties is once again obtained, wherein shaping measures on the film, including cutting, can be carried out during or after the roller application as was explained above.

If the heating layer is produced, optionally on the support, by a suitable method, then subsequently, the heating layer can optionally be bonded, alone or already together with the support, or, for example, a molded article or a cover, by sewing, bonding, with a Velcro strip, etc., which was also already discussed above.

The surface heating system can be operated with DC or AC, wherein the response behavior is better with DC operation.

Other advantages of the surface heating system in accordance with the invention, in comparison with earlier systems with metal heating wires and in addition to the cost advantage, are to be found in the uniform heating behavior and in the lower current consumption, in comparison, for example, to previous conventional seat heating systems with metal heating wires, as a corresponding series of experiments shows.

A seat heating system, which is commonly sold on the market, from the Bauerhin Company (Model S4300), was compared with a surface heating system in accordance with the invention, with a heating mat made of electrically conductive plastic. The seating surface and the reclining seat back could be controlled separately. The heating mat was hooked in via the head rest on the seat above and affixed on the border by an adhesive tape.

The measurements should give information on the heating behavior and the current consumption of the two seat heating systems. The goal of the experiment was specific: to measure the heating times with the corresponding current consumption for the two models. To this end, a DC voltage of 12 V was applied to the connecting terminals of both heating units. The current consumed was measured by means of a current detection device integrated with the power supply. At intervals of 1 min, the temperature and current were measured. A comparison between the two heating units was carried by means of the current consumed by the seat.

| Heating mat made of* conductive plastic Temperature in ° C. | Current in A | Time in min | Heating S4300 Bauerhin Company Temperature in ° C. | Current in A |
| --- | --- | --- | --- | --- |
| 21,4 | 7,4 | 0 | 22,4 | 0,0 |
| 26,0 | 7,1 | 1 | 24,1 | 7,8 |
| 30,4 | 6,8 | 2 | 26,9 | 7,7 |
| 36,0 | 6,7 | 3 | 28,8 | 7,7 |
| 37,0 | 6,6 | 4 | 30,3 | 7,6 |
| 7,0 | 6,6 | 5 | 31,1 | 7,6 |
| 39,1 | 6,5 | 6 | 31,3 | 7,6 |
| 40,3 | 6,5 | 7 | 32,5 | 7,6 |
| 41,4 | 6,5 | 8 | 33,0 | 7,6 |
| 42,1 | 6,5 | 9 | 34,0 | 7,6 |
| 42,6 | 6,5 | 10 | 34,4 | 7,9 |
| 43,1 | 6,5 | 11 | 34,7 | 7,6 |
| 43,7 | 6,5 | 12 | 35,0 | 7,7 |
| 44,4 | 6,5 | 13 | 35,4 | 8,0 |
| 44,7 | 6,5 | 14 | 35,8 | 8,0 |
| 45,1 | 6,5 | 15 | 35,6 | 7,6 |
| 46,0 | 6,4 | 25 | 36,0 | 7,6 |
| 48,1 | 6,6 | 50 | 36,1 | 7,7 |

*[Editor's note: Commas found in the table designate decimal points.]

i) The temperature measurement point was, more or less, at the center of the seat surface with the heating mat of the surface heating system, in accordance with the invention, with the heating layer containing electrically conductive plastic. With the unit according to the conventional model with metal heating wires, the temperature measurement point was approximately 0.5 cm next to a heating wire. The temperature measured on the heating wire itself was 50° C. after 25 min. This temperature is required to realize a surface effect. Considerable problems are connected with this in actual practice, however, in that, for example, the wire can burn out or the seat cover can ignite as a result of excessively high temperatures. These problems are eliminated with the surface heating system in accordance with the invention.

Another not inconsiderable disadvantage of the conventional seat-heating system is the high temperature, under certain circumstances, at various points in locations of the male genital area, which can lead to fertility disturbances. The surface heating system in accordance with the invention does not basically produce excess temperatures, since, in fact, it can release heat over the entire surface and the corresponding site can be omitted or the heat reduced there.

Other experiments have shown that the heating behavior of the seat and back parts is approximately the same.

The superiority of the new surface heating system according to the invention, in comparison with the previous system with metal conductor wires, is indicated quite clearly from the experimental results. The surface heating system with the heating layer containing electrically conductive plastic heats more rapidly and consumes less current than the conventional seat heating system.

The invention thus creates a surface heating system that can release heat over the whole surface, which, even with a construction with a heating layer consisting of individual strips that under certain circumstances are at a distance from one another, can be guaranteed better than in the prior art, conforms, reversibly, to a pressure load on a substrate, such as a seat foam body, and does not lead to an accumulation of moisture or air when used.

In principle, the present invention is not limited to the heating of upholstered objects, but the uses of the surface heating system according to the invention is particularly preferred and advantageous as a seat or mattress heating system for or into/in one seat, especially vehicle seats, into/in a mattress, so that a separate patent is justified with this objective. The flexibility of the heating layer thereby has a special significance.

Figure 13:
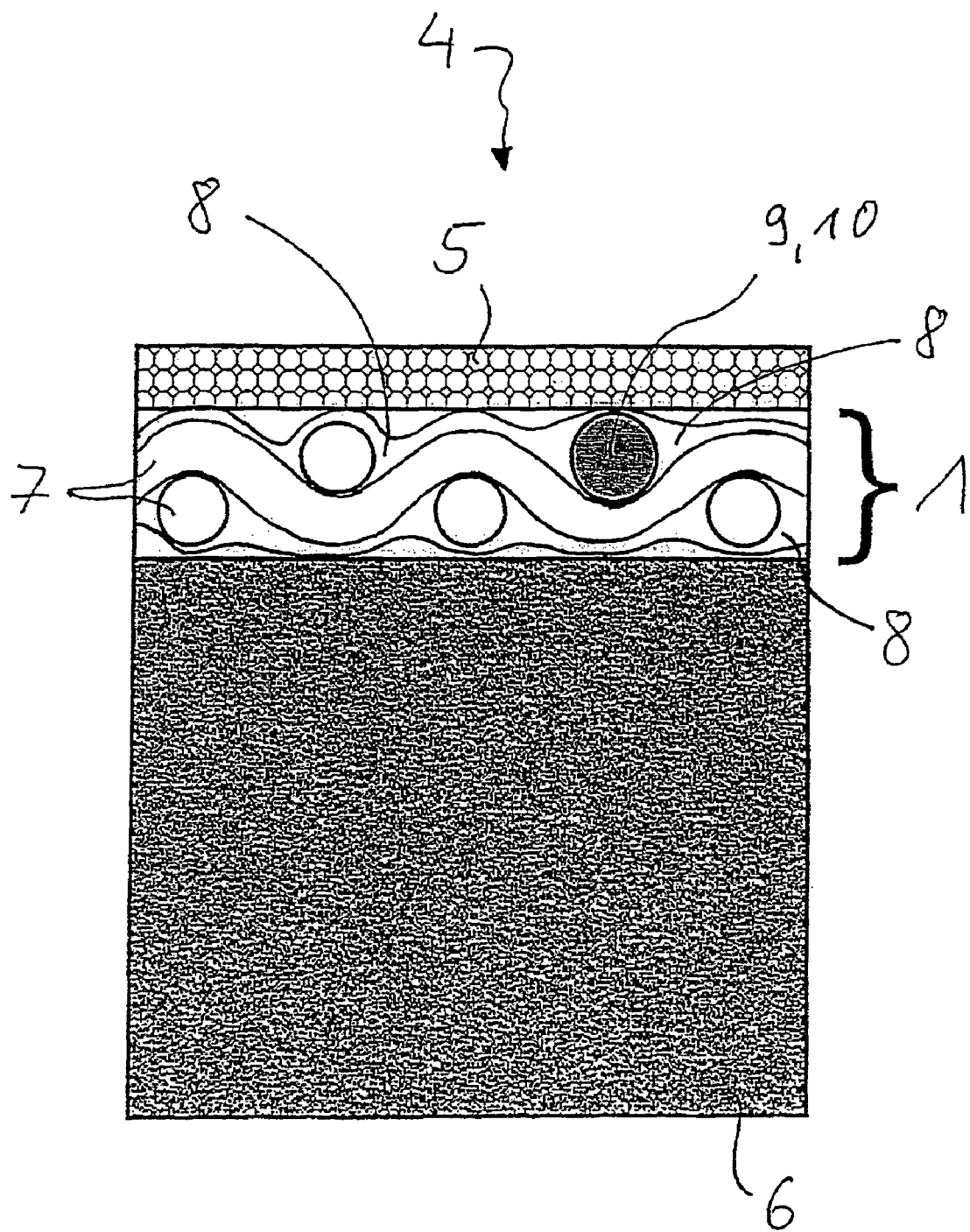
FIG. 13 shows in section another embodiment.

Another preferred configuration of the invention is explained in more detail below with the aid of the embodiment shown in FIG. 13, with reference to this drawing.

Analogously to FIGS. 7a and 7b, a part of a surface heating system 1 is shown, in section, that can be used as a seat heating system 4 as in FIGS. 8a and 8b. As a support 8, this surface heating system 1 comprises a polyester or polyamide fabric with, for example, a mesh size of ca. 5 mm—that is, a meshwork or grid in which adjacent, more or less parallel material strands are approximately 5 mm apart from each other. The structure of the support 8 and its material is not limited to the preceding specifications, but rather can be readily selected by specialists according to particular mechanical requirements. In other words, other materials or material combinations and thicknesses of the material strands and other mesh sizes can also be selected, depending on the application.

The support 8 is provided, by spraying, immersion, rolling, or in some other fashion, with a layer of electrically conductive plastic, in accordance with the present invention, also as indicated in the other documents. This means that the material strands of the polyester or polyamide fabric are completely surrounded or sheathed with the electrically conductive plastic which thus forms the heating layer 7.

As another special feature, current-carrying silver or copper wires are woven into the polyester or polyamide fabric—that is, into the support 8, for example, at a distance of 5 to 10 cm from one another, which form the contact ends 9 and 10 of power supply wires 11 and 12 in analogous fashion to the first embodiment according to FIGS. 1aa and 1ab. Since spraying, immersion, rolling or some other application (with) the layer made of electrically conductive plastic in accordance with the present invention also surrounds or sheathes the silver or copper wires—that is, the contact ends 9 and 10—with electrically conductive plastic, an optimal electrical contact between them is provided. The distance between the silver or copper wires serving as contact ends 9 and 10 of the power supply wires 11 and 12 is not limited to the indicated range of values, but rather can readily be selected by specialists according to particular mechanical and electrical requirements, In other words, other materials or material combinations and thicknesses of the contact ends 9 and 10 and other distances can be selected, depending on the application.

It is preferable, although not a limitation, that the contact ends 9 and 10—in the event that the surface heating system 1 is a seat heating system 4—run in particular approximately 90° to the direction of travel of a motor vehicle (not shown). Basically, however, the contact ends 9 and 10, in the form of the silver or copper wires, can run in any longitudinal or transverse direction.

A particularly preferred material composition for the heating layer 7, that is, for the electrically conductive plastic is as follows:
i)—300 g rubber, which is used in production as granules, in the present case as a very fine dust;
ii)—300 g tetrahydrofuran;
iii)—165 g graphite; and
iv)—300 g of a polyurethane, such as and preferably, 4715 Lupranol from the BASF Company.

This produces a total quantity of 1065 g. For other quantities, the fractions should be calculated accordingly.
i) Preferably, fractions of the individual components of the material composition for the heating layer 7—that is, for the electrically conductive plastic—are as follows:
ii)—ca. 20-35%, preferably about 25-30%, particularly preferably about 28% of a rubber or a material which is the same or acts similarly, in particular mechanically and/or electrically;
iii)—ca. 20-35%, preferably and approximately 25-30%, particularly preferably about 28% tetrahydrofuran or a material which is the same or acts similarly, in particular mechanically and/or electrically;
iv)—ca. 5-25%, preferably and approximately 10-20%, particularly preferably about 15% graphite or a material which, is the same or acts similarly, in particular mechanically and/or electrically; and
v)—ca. 20-35%, preferably and approximately 25-30%, particularly preferably about 28% of a polyurethane, such as and preferably 4715 Lupranol from the BASF Company or a material which is the same or acts similarly, in particular mechanically and/or electrically.

Another configuration possibility of the invention is also explained below. By measuring the change in power consumption of the heating layer 7, it is possible to implement seat occupancy recognition in a particularly simple and advantageous manner. This seat occupancy recognition functions both to determine whether anyone at all is sitting on the seat and also to determine, in particular, the weight of the occupant sitting on the seat. This aspect of the present invention is on the one hand particularly advantageous in connection with the surface heating system and on the other hand can also be used separately from it as only the seat occupancy recognition with a structure and features analogous to those disclosed for surface heating systems in all of the cited documents, with this seat occupancy recognition thus being worthy of a patent by itself alone, and optionally can be a component of separate patent applications and patents.

To the extent that reference was made in the preceding to a seat heating system, the application of the corresponding technology for mirrors in particular, and with particular preference, for outside mirrors of motor vehicles, is to be regarded as essential within the framework of the invention.

In the preceding, the present invention was explained in more detail with the aid of embodiments, to which, however, the invention is not limited. All modifications, variations, and substitutions of the features explained in the preceding and given in the drawings are comprised in the area of the technical knowledge of the present invention. In particular, all design possibilities which lie within the framework of the pertinent claims belong to the invention. In particular, also, the indicated uses of the heating devices in accordance with the invention are disclosed and are optionally to be regarded, separately, as worthy of a patent.

What is claimed is:
1. A surface heating system comprising a heating device having a heating layer including an electrically-conductive plastic and adhesive characteristics at least in some sections of at least one side or at least in some sections of both sides of the heating layer, and wherein a material composition for the heating layer includes the following:
ca. 20-35% of a rubber;
ca. 20-35% of a tetrahydrofuran;
ca. 5-25% of a graphite; and
ca. 20-35% of a polyurethane.

2. The surface heating system according to claim 1, wherein the material composition for the heating layer includes:
ca. 25-30% of a rubber;
ca. 25-30% of a tetrahydrofuran;
ca. 10-20% of a graphite; and
ca. 25-30% of a polyurethane.

3. The surface heating system according to claim 1, wherein an adhesive agent imparts the adhesive characteristics.

4. The surface heating system according to claim 3, wherein the adhesive agent is a glue or a foamed material.

5. The surface heating system according to claim 1, wherein the heating layer is an adhesive strip.

6. The surface heating system according to claim 5, wherein the adhesive strip is a glue.

7. The surface heating system according to claim 3, wherein the adhesive agent is curable.

8. The surface heating system according to claim 7, wherein the adhesive agent is cured and remains at least essentially cured when the temperature is raised.

9. The surface heating system according to claim 1, further comprising a heatable object, wherein at least one component of the heatable object is bonded to the heating layer by means of the adhesive characteristics at least in some sections of at least one side of the heating layer.

10. The surface heating system according to claim 9, wherein additional components of the heatable object are bonded to the heating layer by means of the adhesive characteristics at least in some sections of both sides of the heating layer.

11. The surface heating system according to claim 9, wherein the heating layer is bonded in only one section of the component of the heatable object.

12. The surface heating system according to claim 9, wherein the heating layer is present at least essentially over an entire surface of the component of the heatable object.

13. The surface heating system according to claim 1, wherein the heating layer has a thickness of at least approximately 0.05 mm to at least approximately 1.2 mm.

14. The surface heating system according to claim 1, further comprising a support, wherein the support is a layer of woven fabric, a non-woven fabric, a natural fibrous non-woven fabric, or a synthetic fibrous non-woven fabric.

15. The surface heating system according to claim 1, wherein the heating layer includes polyurethane and the electrically conductive plastic includes graphite in powdered form.

16. The surface heating system according to claim 15, wherein the polyurethane is selected from the class consisting of single-component polyurethane, crosslinked single-component polyurethane, a PU foam, UV-resistant plastic, hydrolysable plastic, and vapor-permeable plastic material.

17. The surface heating system according to claim 1, further comprising a support to which the heating layer is mounted, wherein contact ends of power supply wires in the heating layer or between the support and the heating layer contact the heating layer.

18. The surface heating system according to claim 17, wherein the contact ends of the power supply wires are affixed to the heating layer by means of the heating layer itself.

19. The surface heating system according to claim 17, wherein the contact ends of the power supply wires are sewn or bonded to the heating layer, to the support, or to both heating layer and support.

20. The surface heating system according to claim 1, further comprising a support, wherein the heating layer is formed on the support directly, by spraying, rolling, or spreading.

21. The surface heating system according to claim 1, further comprising a support, wherein the heating layer is bonded, sewn, or soldered to the support.

22. The surface heating system according to claim 17, wherein the support is a molded article made of an elastic material.

23. The surface heating system according to claim 22, wherein the molded article is a seat upholstery of a seat surface part, a reclining part of an upholstery of a seat, a flat piece of furniture, or a mattress.

24. The surface heating system according to claim 17, further comprising a current control connected to a power supply by the power supply wires, wherein the contact ends of the power supply wires are in contact with the heating layer.

25. The surface heating system according to claim 24, wherein the current control is operated manually, electrically, electronically, or automatically.

26. The surface heating system according to claim 17, wherein the support is formed by a fabric, wherein the fabric includes polyester or polyamide fabric having a mesh size of approximately 5 mm.

27. The surface heating system according to claim 26, wherein contact ends of power supply wires are woven into the fabric and distanced approximately 5 to 10 cm from each other.

28. The surface heating system according to claim 27, wherein the power supply wires are formed from silver or copper.

29. The surface heating system according to claim 26, wherein the support is mounted to the heating layer by spraying, immersion, or rolling with a layer of electrically conductive plastic and the support and the contact ends are surrounded completely by the electrically conductive plastic.

30. A heatable object contained in the surface heating system according to claim 1.

31. The heatable object according to claim 30, wherein the heatable object is a seat surface part, the reclining part of a seat, upholstery of a seat, or reclining piece of furniture and the heating layer is adapted anatomically to an upper thigh buttocks part or a back part of a user.

32. The heatable object according to claim 31, wherein the heating layer is anatomically formed in a plane of the seat surface part, the reclining part of a seat, upholstery of a seat, or flat piece of furniture and is present or electrically conductive only in accordance with anatomical specifications.

33. The heatable object according to claim 30, wherein the heating layer has a corresponding thickness profile for an anatomically adapted release of heat.

34. The heatable object according to claim 30, wherein the heatable object is an upholstered cover of a vehicle.

35. The heatable object according to claim 34, wherein the surface heating system is designed for release of heat that varies over the surface.

36. The heatable object according to claim 30, wherein the heating layer is profiled in the extent of its surface or thickness or its surface and thickness for a release of heat that varies over its surface.

* * * * *